United States Patent [19]

Miller et al.

[11] Patent Number: 5,927,003
[45] Date of Patent: *Jul. 27, 1999

[54] POLYMERIC MEDIA AMENDMENT

[76] Inventors: Deborah L. Miller; John C. Miller, both of 32 Deer Point Dr., Hawthorne Woods, Ill. 60047

[ * ] Notice: This patent is subject to a terminal disclaimer.

[21] Appl. No.: 08/393,807

[22] Filed: Feb. 24, 1995

Related U.S. Application Data

[63] Continuation-in-part of application No. 08/222,796, Apr. 5, 1994, Pat. No. 5,514,191.

[51] Int. Cl.$^6$ .............................. A01G 1/00; A01G 7/00
[52] U.S. Cl. ..................... 47/58; 47/DIG. 3; 47/DIG. 10
[58] Field of Search .................. 47/58, DIG. 3, 47/DIG. 10, 1.1

[56] References Cited

PUBLICATIONS

Nus (Jun. 1992) Golf Course Management, pp. 26–40, 1992.
Azzam (1980) Commun. in Soil Science and Plant Analysis vol. 11 (8): 767–834, 1980.

*Primary Examiner*—Che S. Chereskin

[57] ABSTRACT

A medium for enhancing growth and availability of water and nutrients during plant growth, comprising a synthetic resin and a support material, the resin consisting essentially of a substantially-linear, non-gelling, water-soluble polymer capable of forming a water absorbing network with the support material, such that the polymer is dispersed within the material upon exposure to water and retains and transports water and nutrients for seedling growth. Use of such polyacrylamides benefits growth by retaining water, reducing evaporation loss, improving yields and enhancing nutrient uptake.

17 Claims, 39 Drawing Sheets

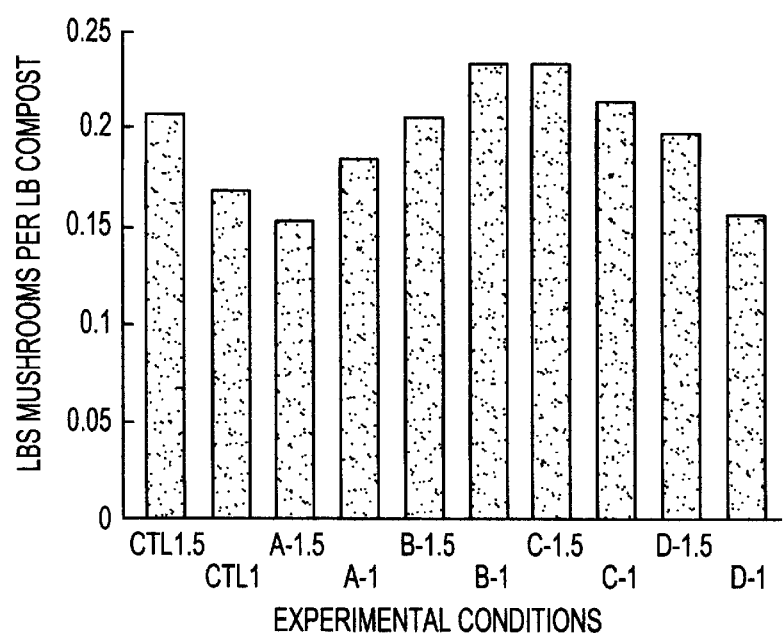

|  | CTL1.5 | CTL1 | A-1.5 | A-1 | B-1.5 | B-1 | C-1.5 | C-1 | D-1.5 |
|---|---|---|---|---|---|---|---|---|---|
| Large | .033 | .037 | .021 | .052 | .023 | .065 | .036 | .083 | .044 |
| Medium | .106 | .109 | .095 | .098 | .126 | .13 | .143 | .104 | .127 |
| Small | .033 | .011 | .02 | .010 | .039 | .018 | .031 | .015 | .016 |
| Open | .036 | .011 | .017 | .024 | .018 | .021 | .024 | .012 | .011 |

|  | CTL1.5 | CTL1 | A-1.5 | A-1 | B-1.5 | B-1 | C-1.5 | C-1 | D-1.5 |
|---|---|---|---|---|---|---|---|---|---|
| Large | 15.9 | 22.2 | 13.6 | 28.2 | 11.2 | 27.9 | 15.4 | 33.9 | 22.2 |
| Medium | 51.1 | 65.2 | 62.5 | 53.4 | 61.4 | 59.8 | 61.3 | 48.4 | 64.2 |
| Small | 15.9 | 6.3 | 12.7 | 5.6 | 18.9 | 7.5 | 13.3 | 7.0 | 8.3 |
| Open | 17.1 | 6.3 | 11.2 | 13.0 | 8.5 | 8.8 | 10.0 | 5.7 | 5.5 |

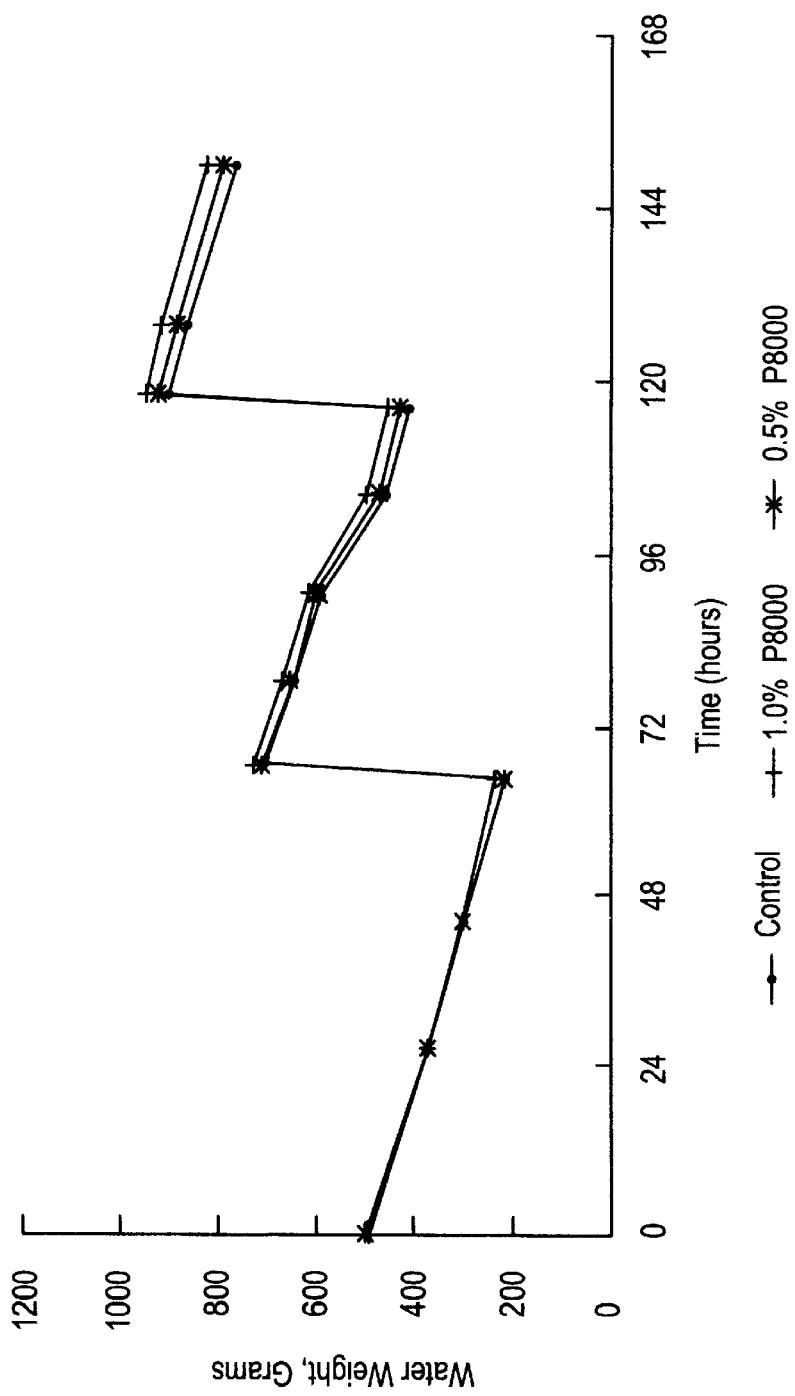

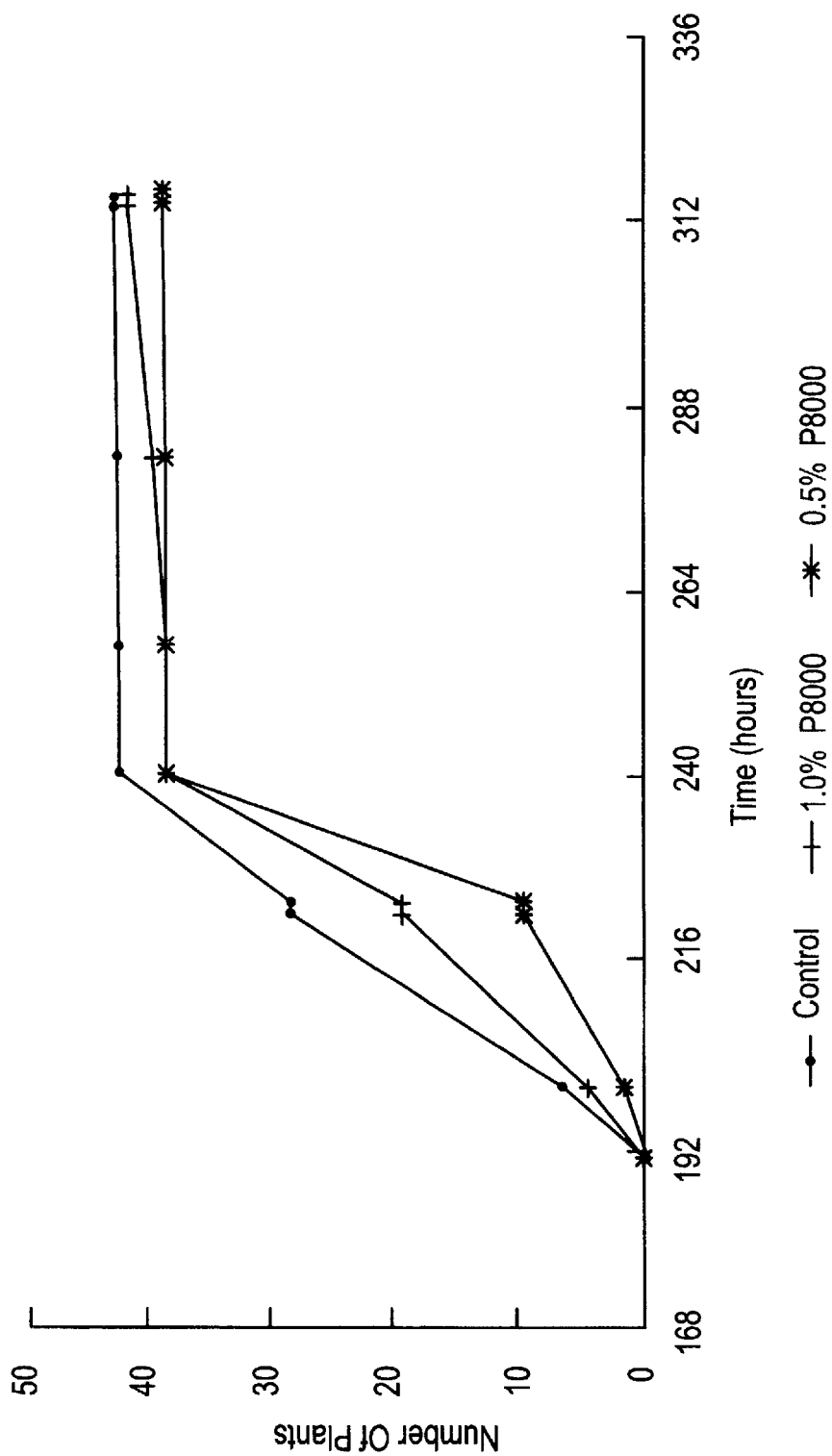

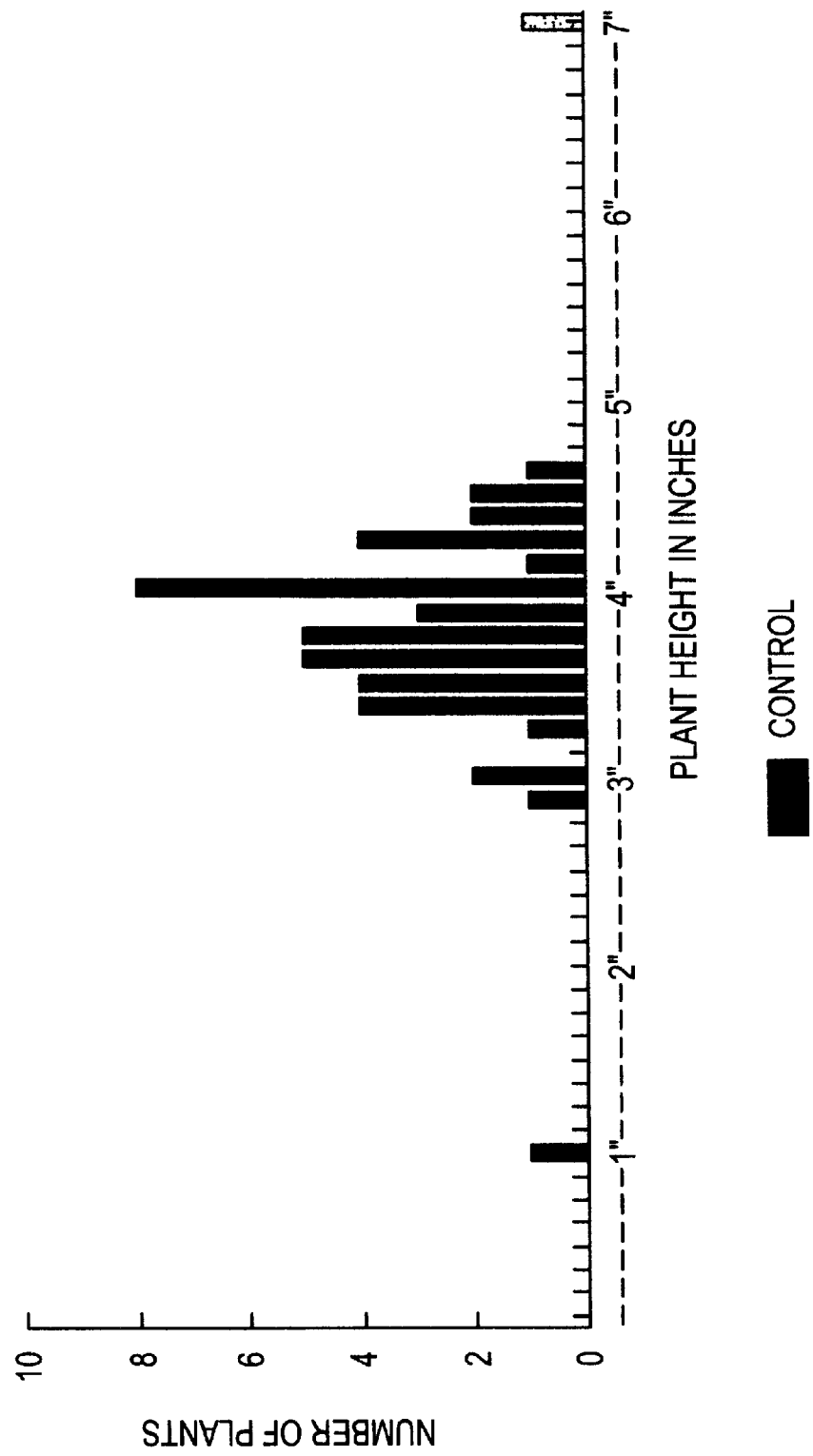

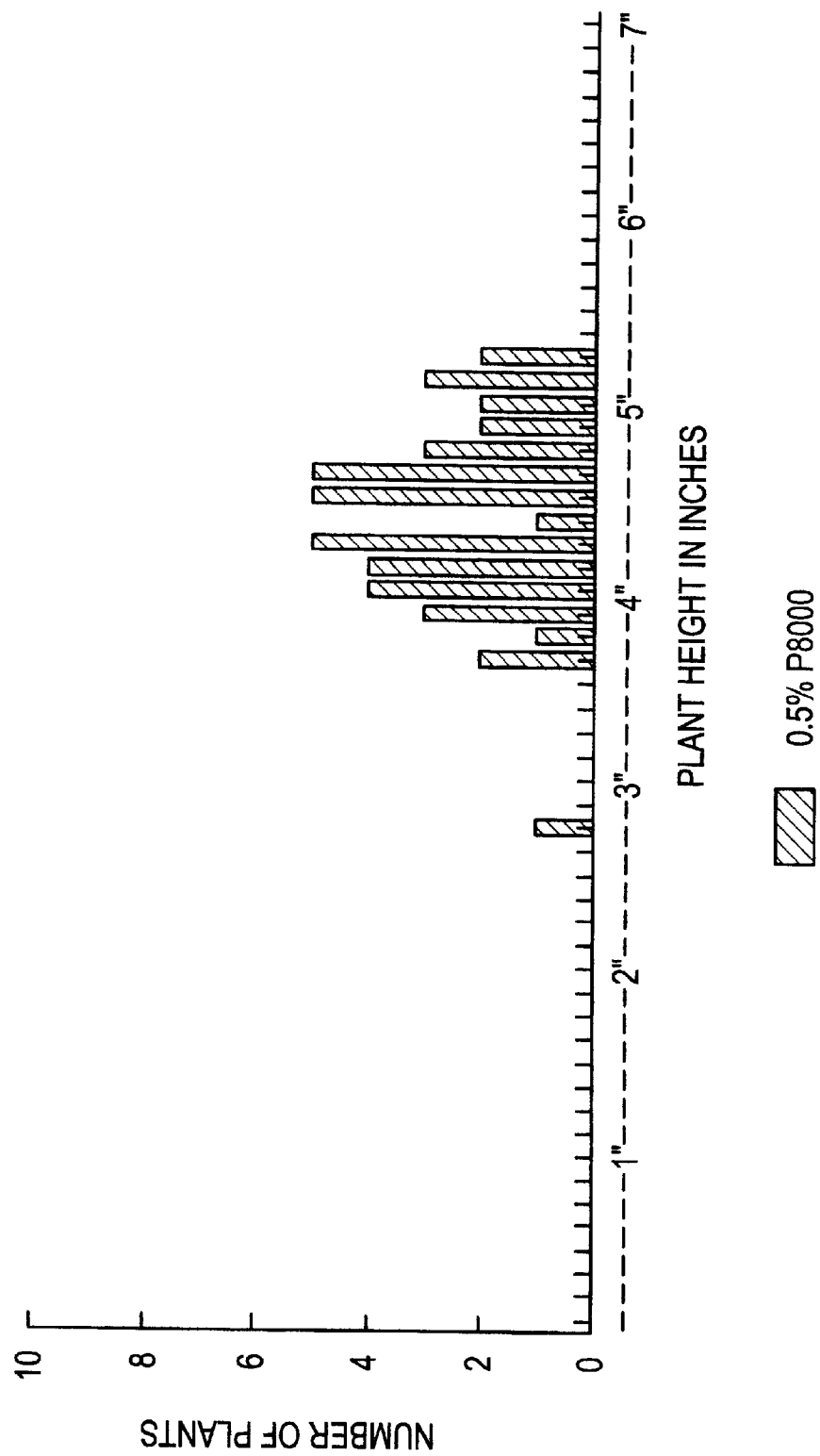

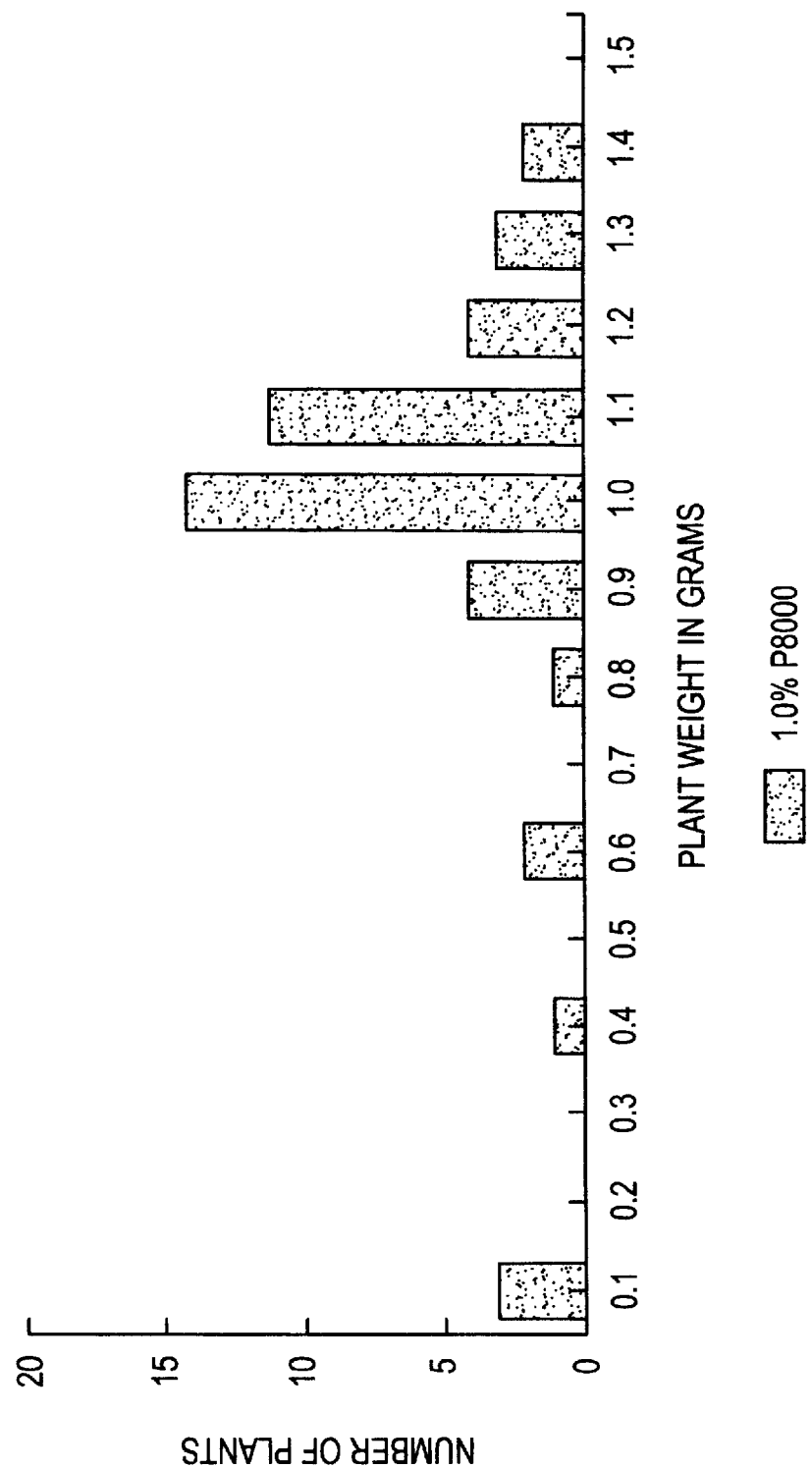

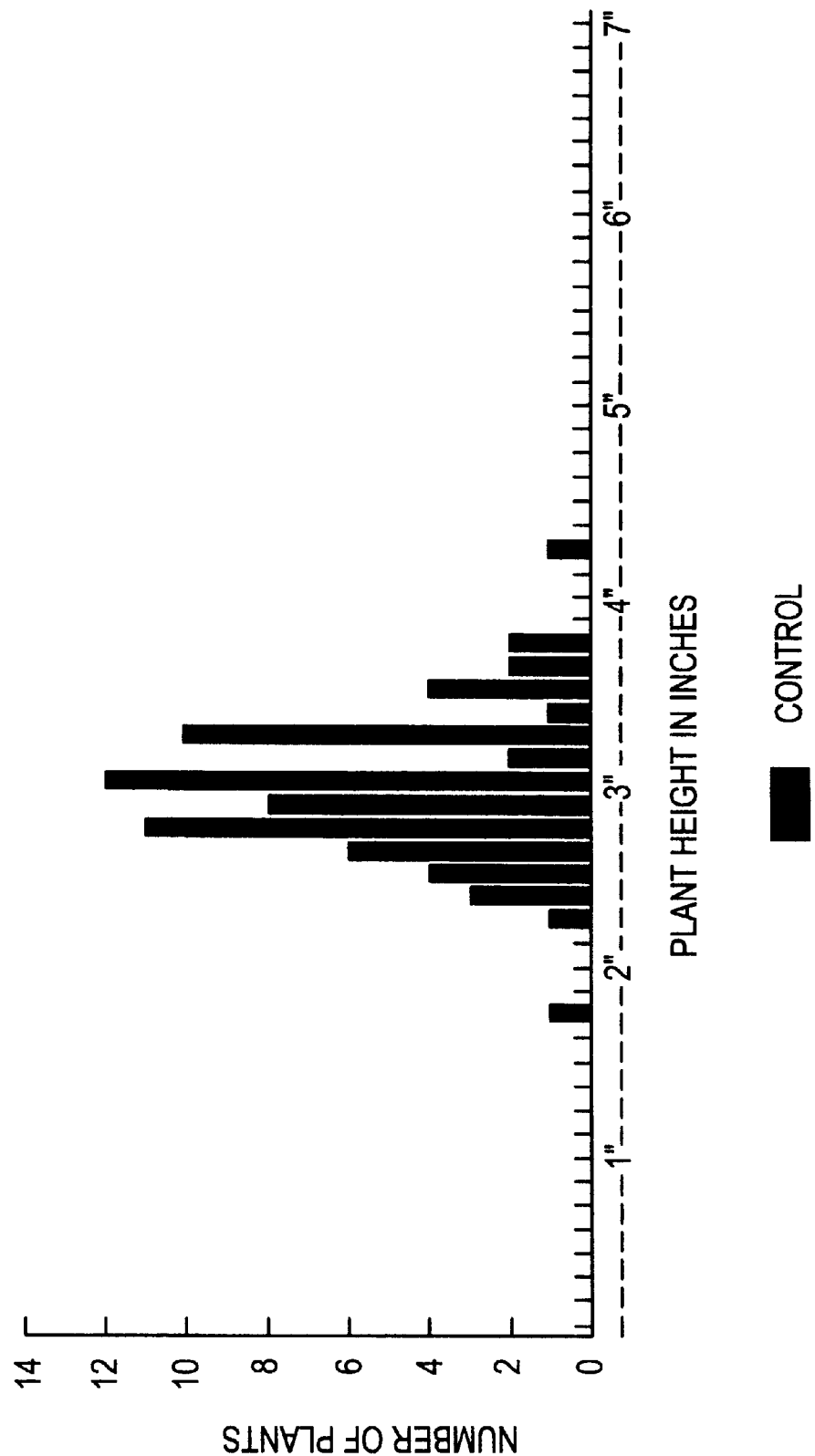

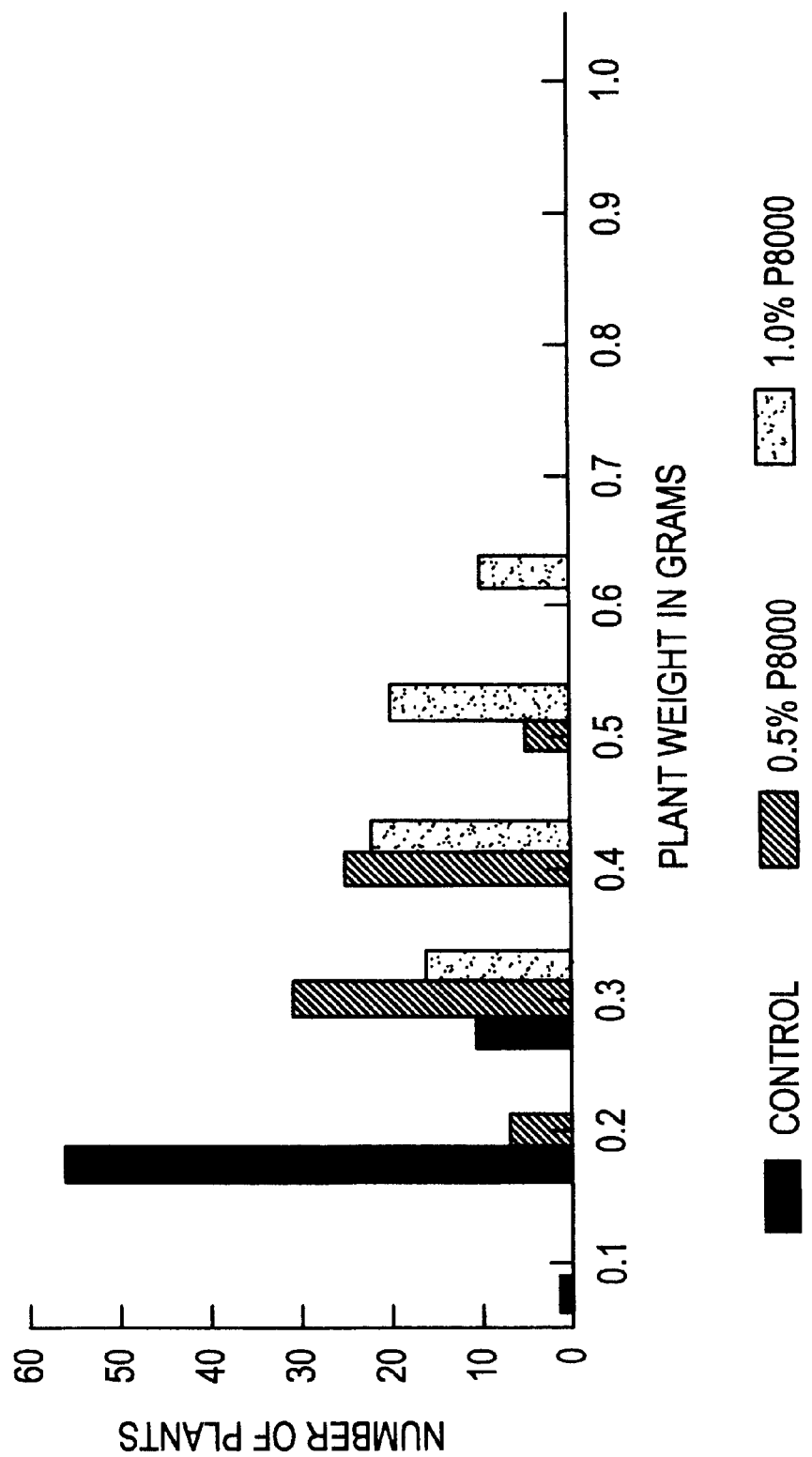

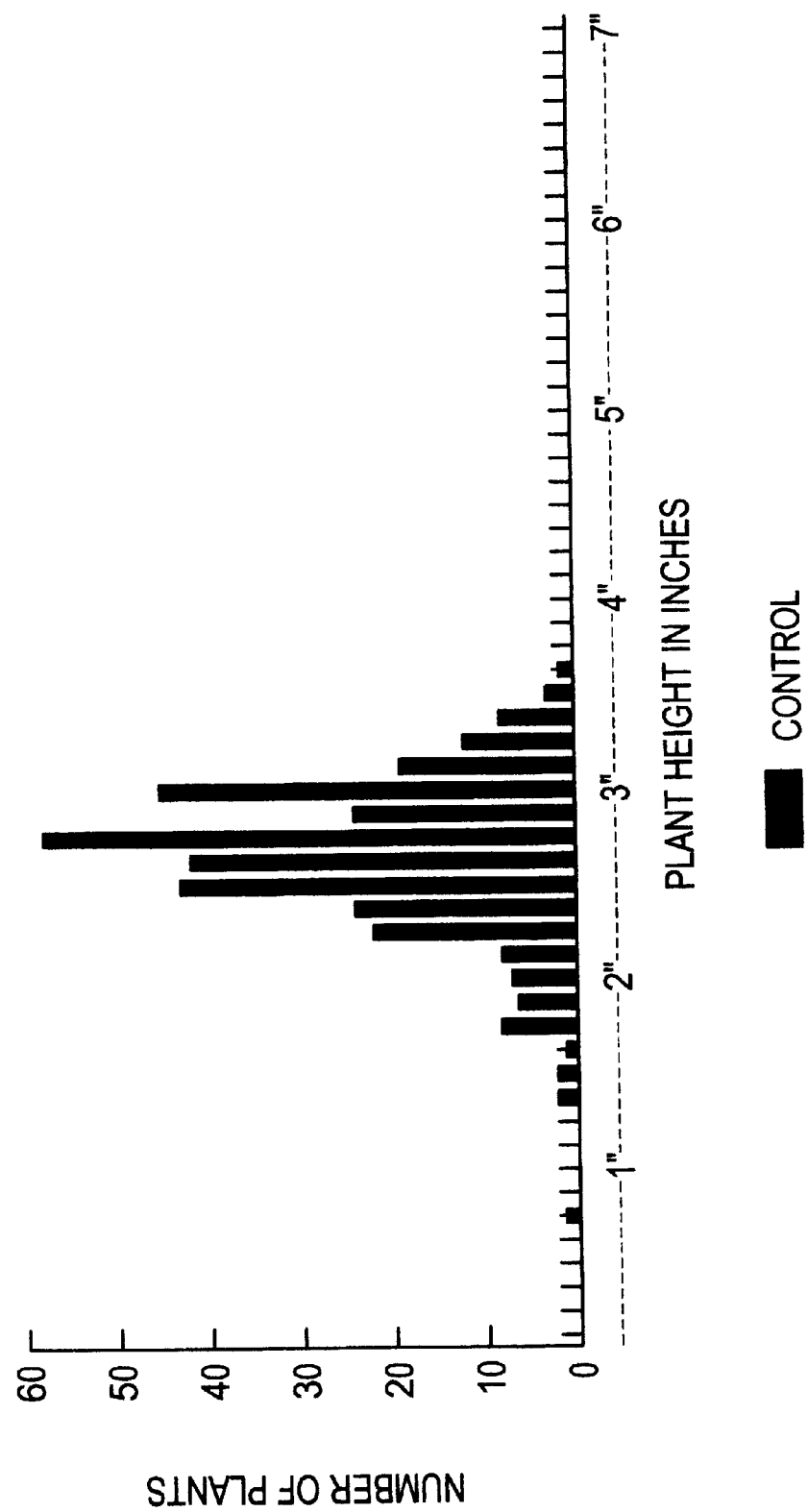

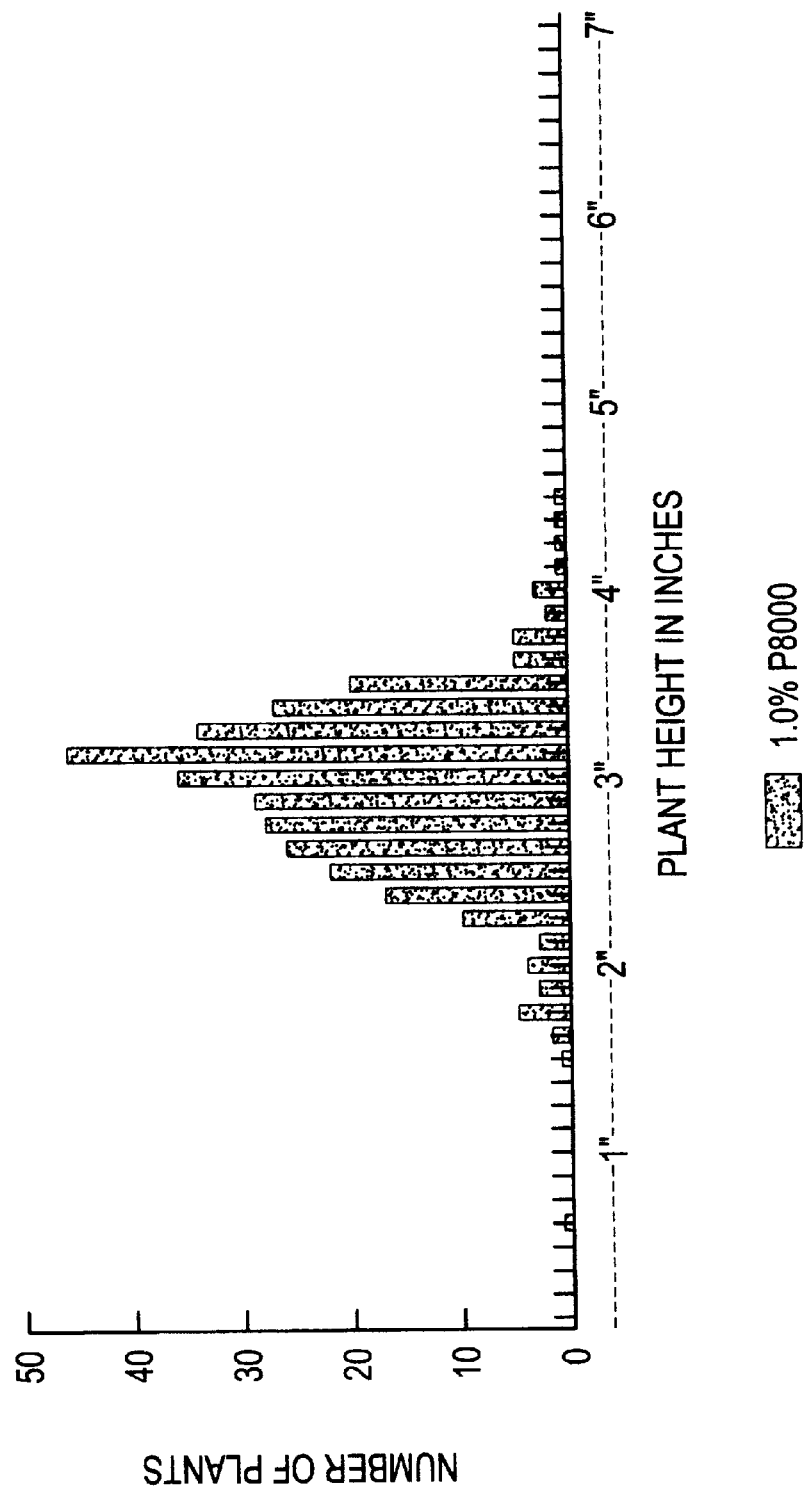

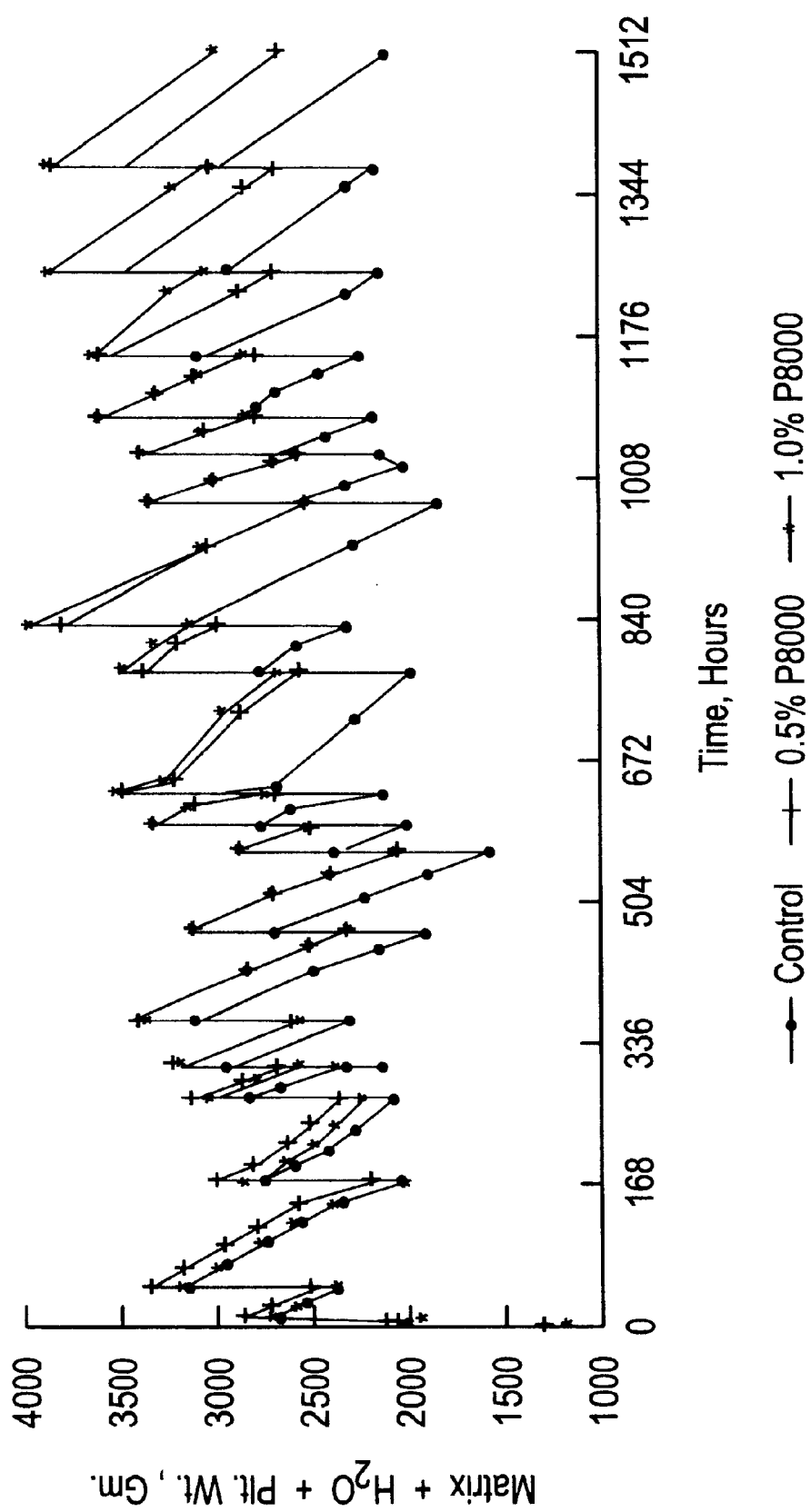

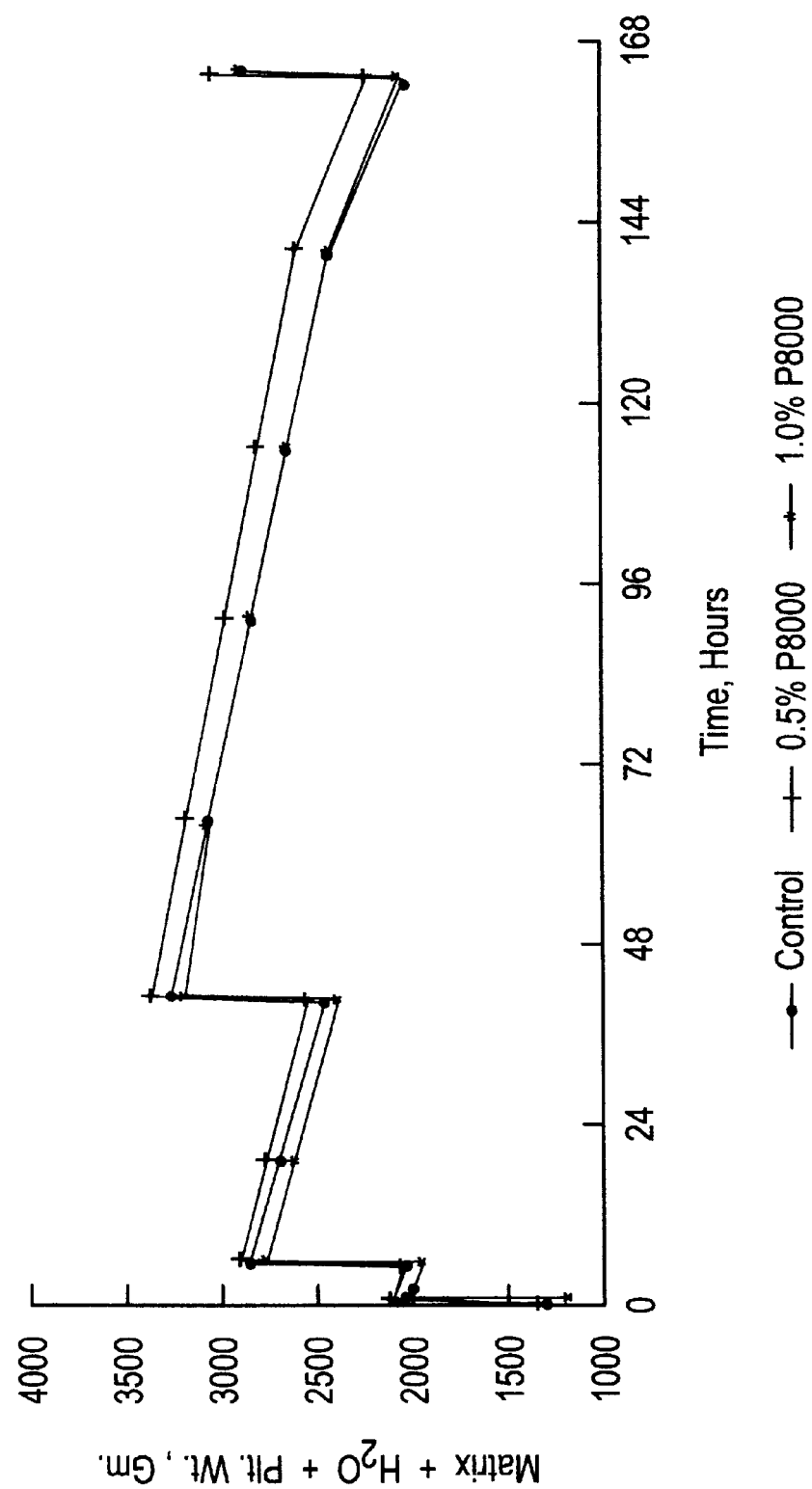

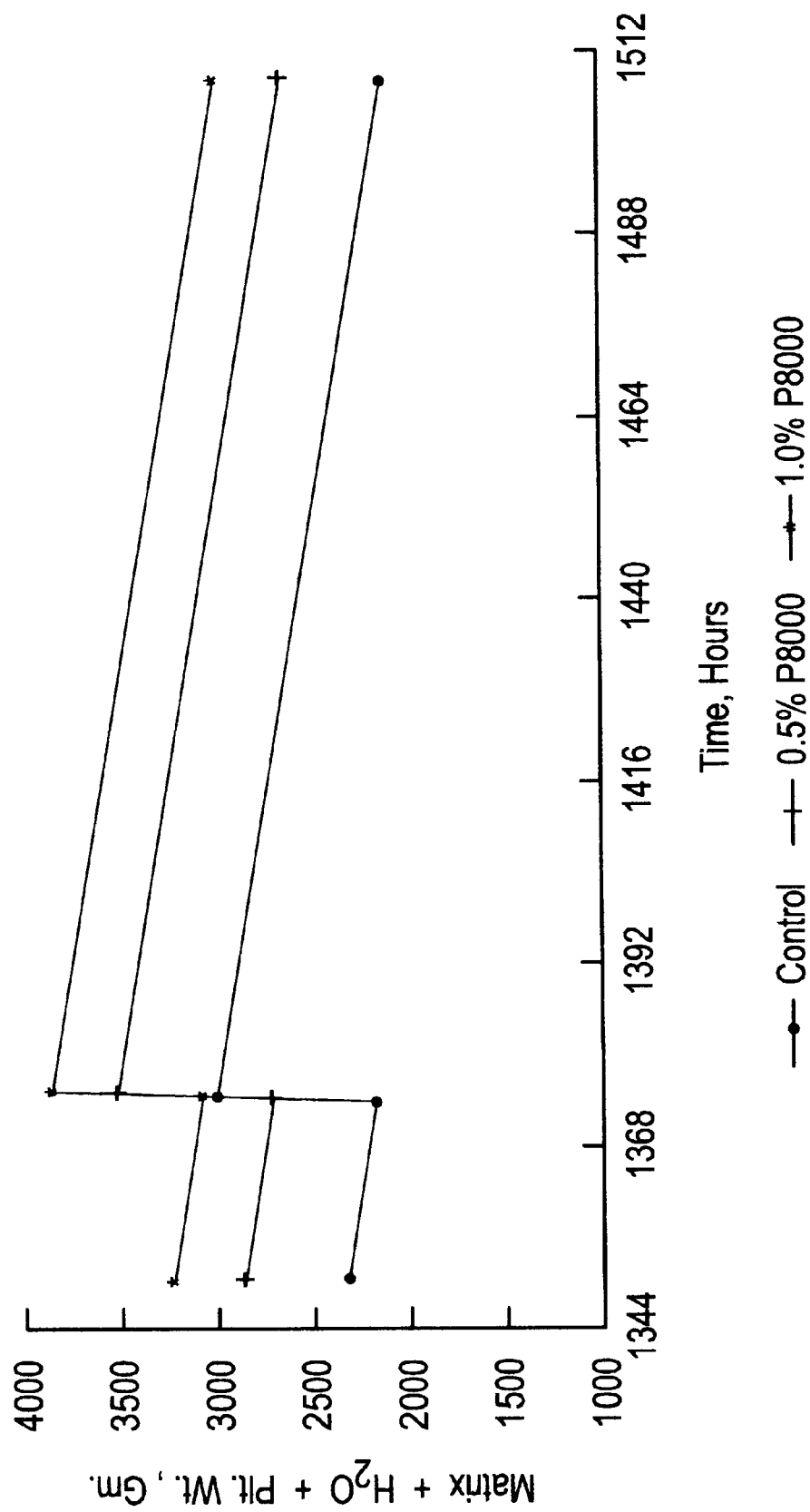

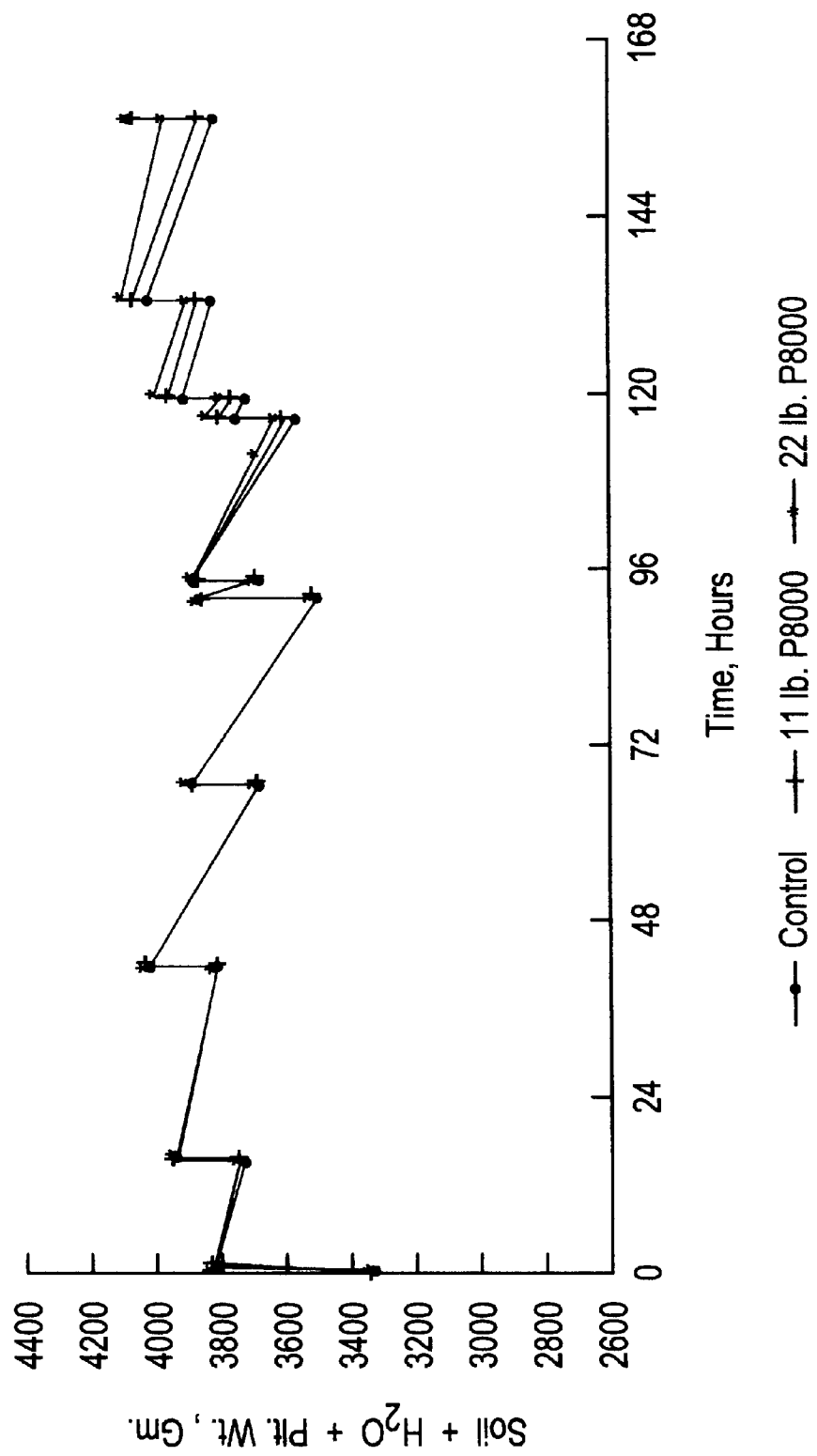

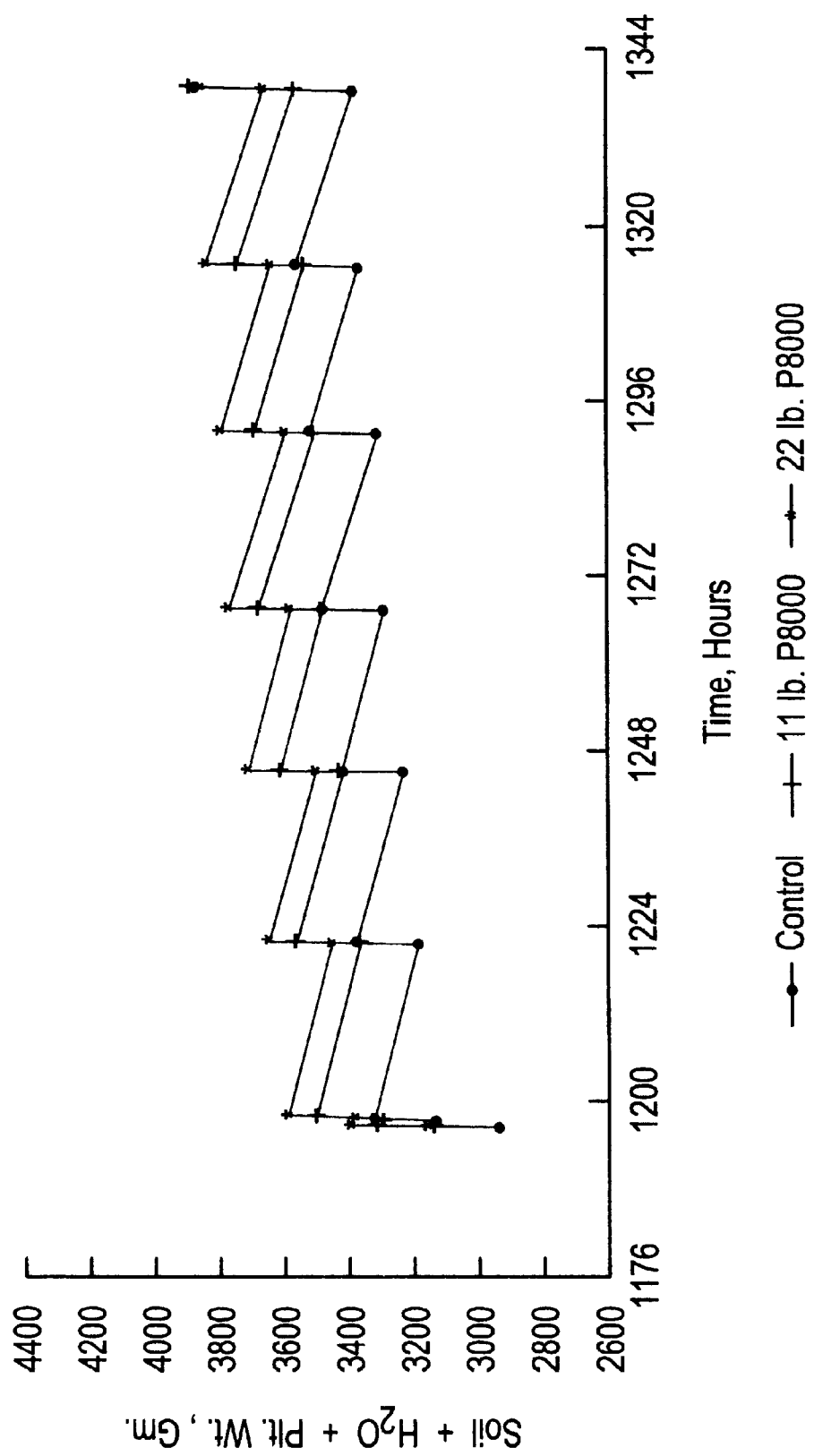

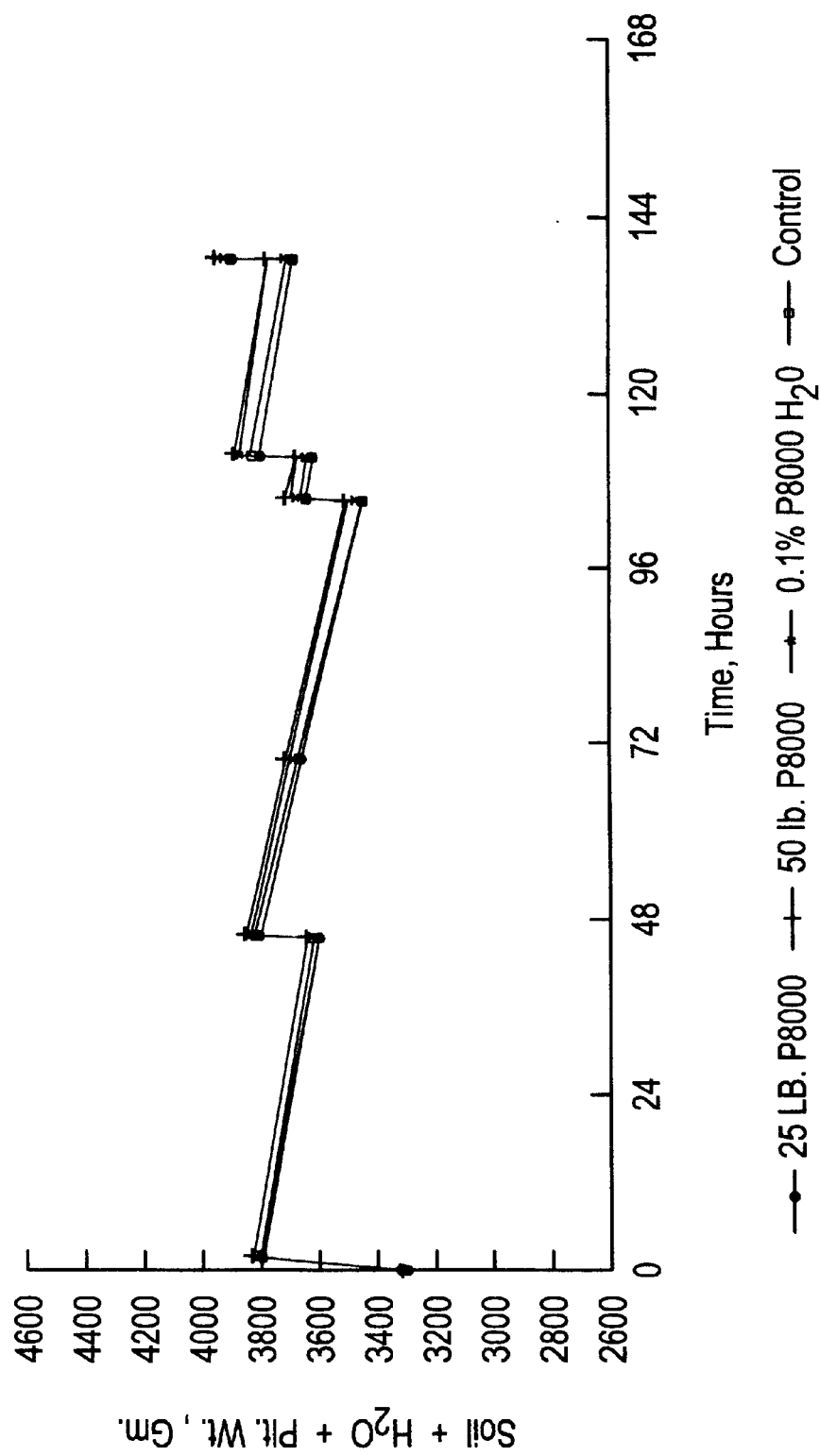

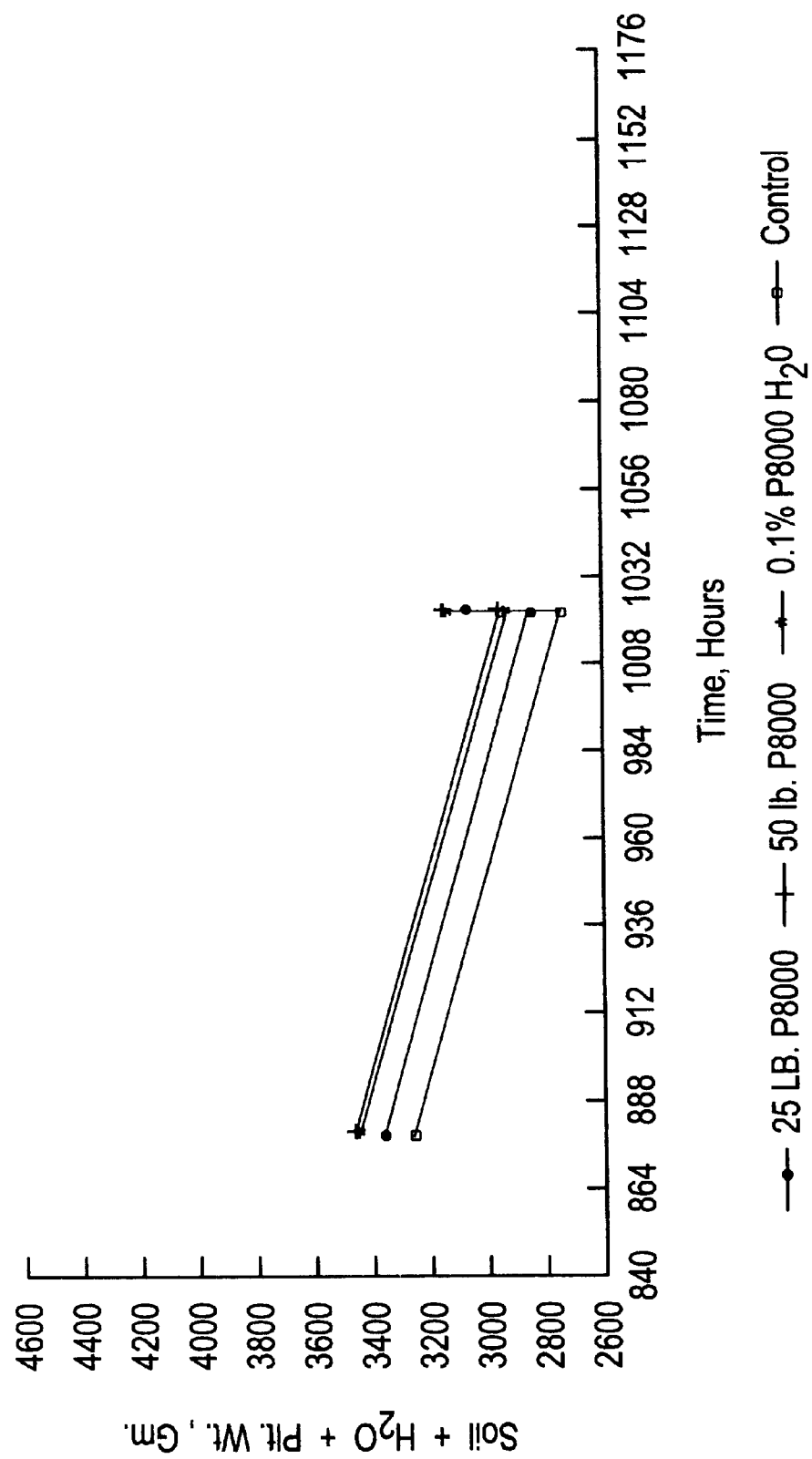

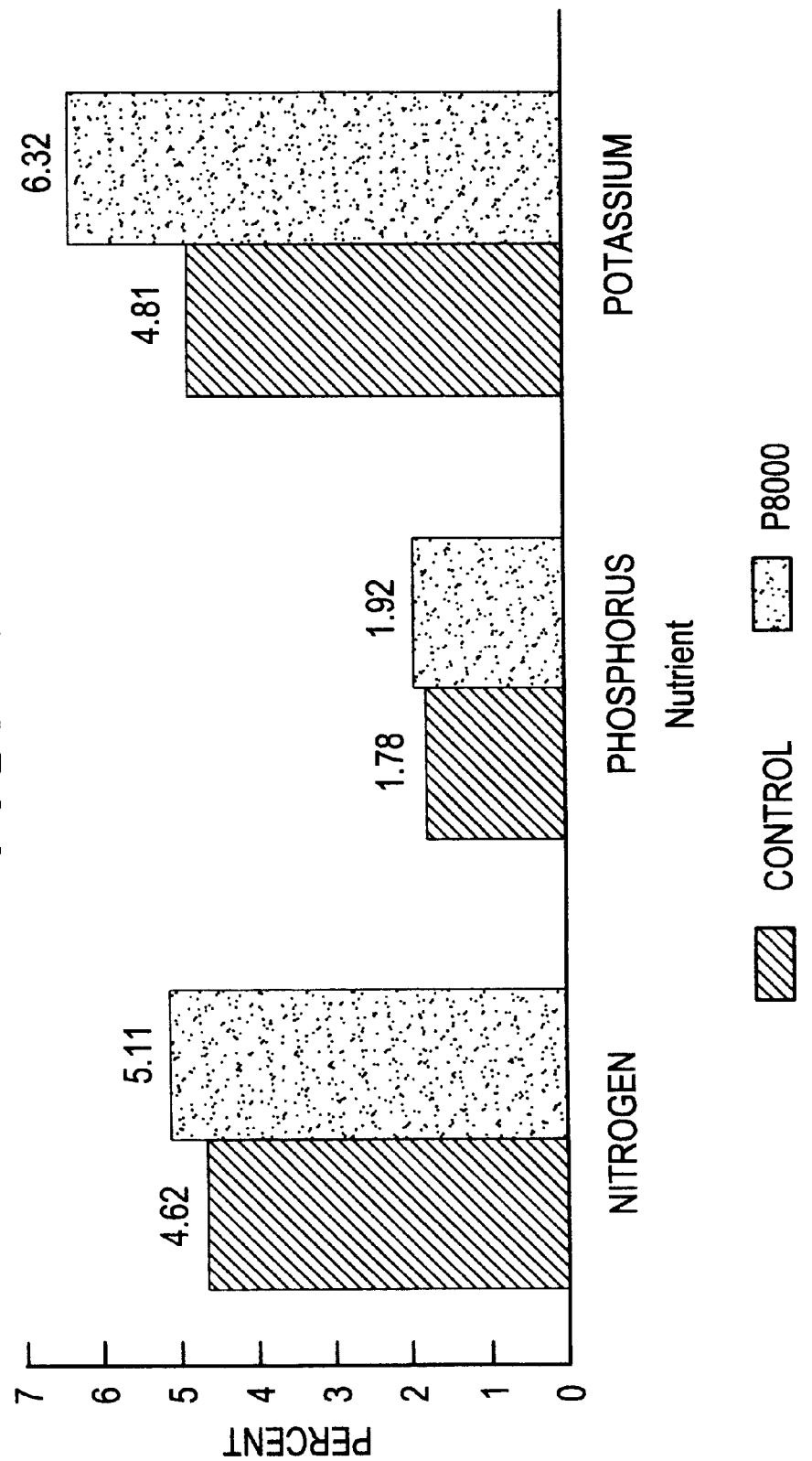

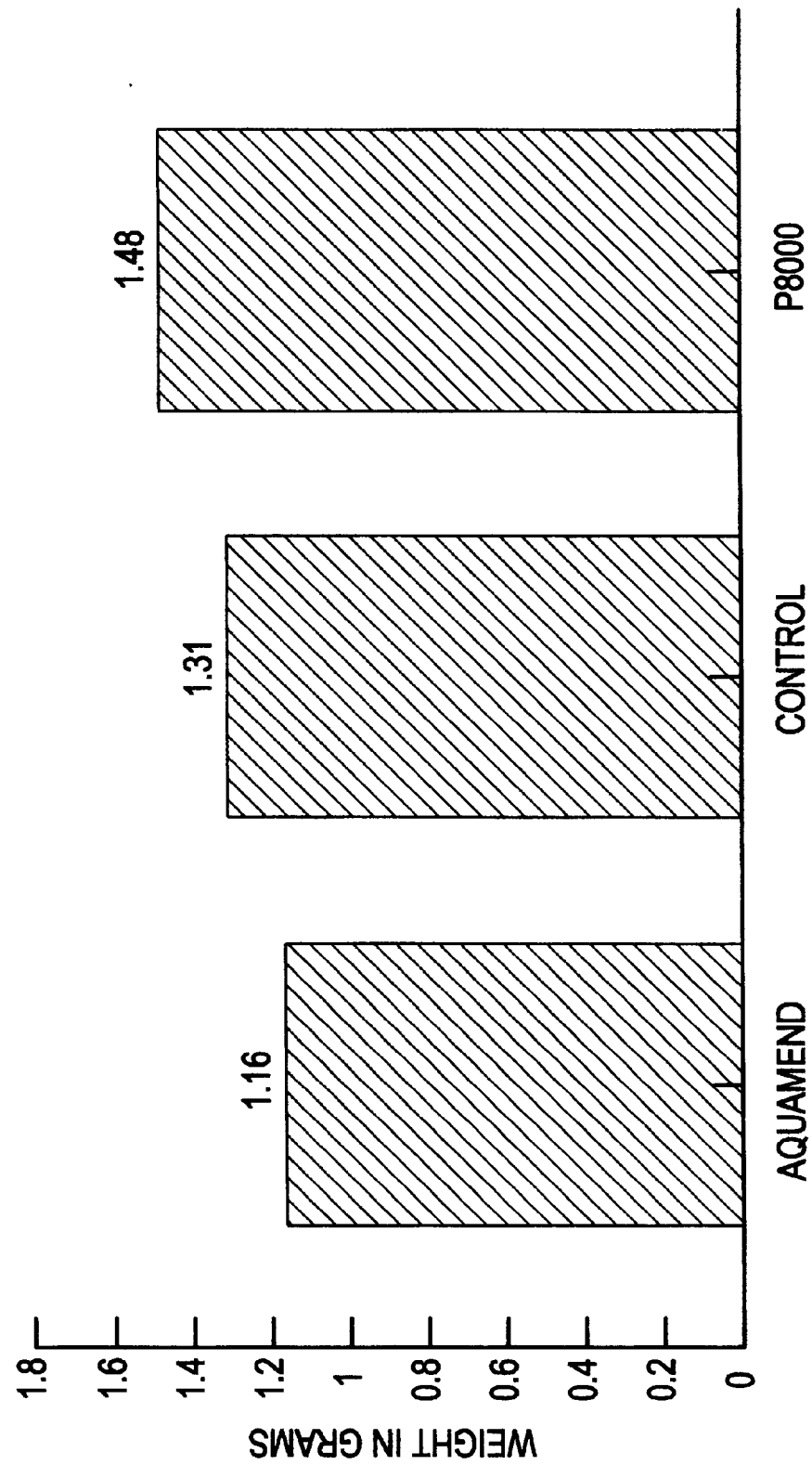

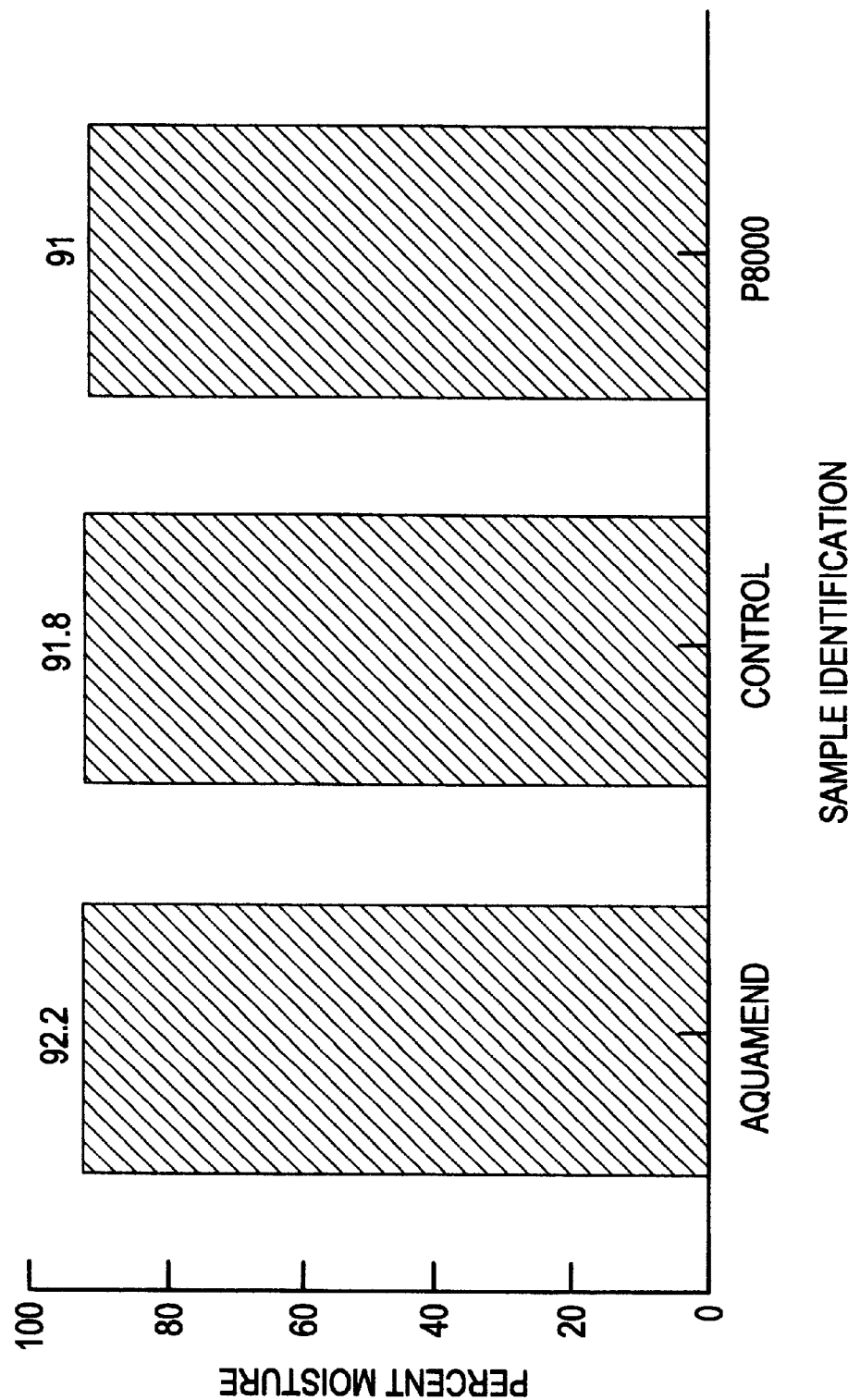

POLYMERIC MEDIA AMENDMENT

This application is a Continuation-in-Part of Ser. No. 222,796, Filed Apr. 5, 1994 now U.S. Pat. No. 5,514,191 issued May 7, 1996 Entitled "Polymeric Media Amendment for Growing Mushrooms."

FIELD OF THE INVENTION

This invention is related generally to the use of linear, non-gelling water-soluble polymers, copolymers, and the like to improve the availability of water and nutrients to greenhouse and nursery vegetable, ornamental and floral stock during their growth and development, when added to support materials and used as part of the growing media.

BACKGROUND OF THE INVENTION

Vegetable crops and ornamental and floral plants can be established in the field or end-use locations in various ways, but principally by direct seeding or transplants grown in containers in greenhouses, protected beds, or open fields. Transplant production is a highly specialized aspect of the greenhouse and nursery industry, one which demands careful attention to plant growth and development-particularly, the choice of the growing medium. Under greenhouse/nursery conditions, field soil, alone, is usually inadequate for reasons relating to aeration and poor drainage. Addition of sand and/or peat improves the use of field soil as a seeding mixture. Artificial mixtures are advantageous in that they address the deficiencies of field soil and are free from pests, bacteria, and the presence of undesirable chemicals.

The most common media used in containerized systems are mixtures of peat and vermiculite or perlite, bark and wood chips, or mixtures thereof. Container types range from wooden troughs to rigid plastic pots to polyethylene bags. Such materials are light-weight for easy handling and movement in and out of a greenhouse setting, can be used for several successive crops, are relatively inexpensive, and easier to manage compared to recirculated hydroponic systems.

As described in the aforementioned co-pending application, white mushroom farming, representative of mushroom production, consists of six steps: Phase I composting and Phase II composting followed by spawning, casing, pinning, and cropping, in succession. Composting involves preparation of the nutrient base (Phase I) and pasteurization/de-ammonifization (Phase II) for the mushrooms. See, Wuest, Duffy, and Royce, *Six Steps to Mushroom Farming,* Penn State Univ., Col. of Ag. Sci.—Coop. Ext. Spec. Cir. 268 circa 1979, incorporated herein in its entirety. Spawning is the process by which the grower inoculates the compost with the mushroom "spawn", (mushroom mycelia propagated vegetatively).

In Step 4, the spawn-run compost is cased, whereby a top-dressing of selected materials (typically, clay-loam field soil, a mixture of peat moss with ground limestone, or reclaimed, spent compost) is spread uniformly over the surface of the compost on which the mushrooms eventually form. This casing is typically pre-wet to a high moisture level, and thereafter acts as a water reservoir and a place for the growth and fusion of mycelia into rhizomorphs. Without rhizomorphs, no primordia, or pins, form, and there would be no mushrooms. Uniformity of the casing over the compost is very important because it allows the spawn to move into and through the casing at the same rate. Additionally, it is critical that the casing medium be able to hold water, as the continuous availability of moisture is essential for the development of a firm, marketable mushroom of acceptable size, and, ultimately for profitable yields. Throughout the period following casing, water is applied intermittently to maintain the moisture level. Knowing when, how, and how much water to apply to the casing material is considered an art form in the industry and critical to efficient production.

Mushroom initials develop as outgrowths on rhizomorphs formed in the casing. The initials grow in size to form structures referred to as pins, which in turn continue to expand and grow through a button stage and ultimately enlarge into a mushroom. Depending upon growing conditions, mushrooms can be harvested 18–21 days after casing. Pin development can be controlled, in part, by the concentration of carbon dioxide in the atmosphere above the casing. Optimal pin development is dependent upon a time reduction of carbon dioxide concentration, along with maintenance of sufficient moisture and relative humidity. Buttons continue to develop and enlarge through the cropping period. Individual crops or "breaks" are gathered during repeating 3–5 day harvests throughout the cropping phase. Several breaks may be harvested in succession followed by a several day period in which no new mushrooms appear. This break/harvest cycle is repeated several times during cropping, which may last anywhere from 35–150 days depending on the mushroom variety and growing technique.

While each phase or step in the mushroom production process is critical to the growth cycle and the overall yields obtained, the casing Step 4 presents particular problems and the opportunity for unique solutions. Much the same can be said for the production of greenhouse and nursery stock.

One approach, used with limited success is to add the so-called "superabsorbant" polymers to the casing medium to increase moisture availability to the mushroom spawn. None of these additives have met with any degree of commercial success, due to a number of significant problems and deficiencies. First of all, the superabsorbants are highly cross-linked polymers which form gel networks, absorbing many times their weight in water. However, due to their high gel strength the superabsorbants (hydrogels) do not readily give up their water to the growing mushroom mycelia. Second, because these superabsorbant polymers are gels and water-insoluble under use conditions, they present a discontinuous lump, or water reservoir, which is only available to mycelium in the immediate vicinity of the gel network. As a result, they do not coat the peat strands. Third, at the concentrations used in mushroom production (1–3% by weight), they do not form a supply of water sufficient for the growing mushrooms and, in fact, compete with the growing mushroom mycelium for the available water supply. Fourth, they are difficult to add to the casing mixture because of their tendency to agglomerate and clump. The superabsorbants do not wet out on a peat strand and are difficult to uniformly mix throughout the casing. Fifth, additives of this sort are expensive, averaging about $6.00 per pound, and available only at costs which unduly cut profit margins and render them unfeasible for widespread use. Finally, the superabsorbants of the prior art are adversely affected by osmotic pressures induced by the presence of ionic concentrations. This phenomenon is observed dramatically with the collapse of the gel/matrix in the presence of commercial fertilizer and subsequent loss of water retention.

Ornamental and floral nursery stock and many vegetables including but not limited to tomatoes, peppers, broccoli, cauliflower, lettuces, and celery are cultivated commercially in greenhouses from seeds for transplant to the field and later use by growers ranging from the backyard gardener to the corporate commodity producer. The grower has an interest in purchasing hardy, vigorous stock which will withstand the trauma of handling, shipment, and transplanting with minimal growth interruption. In addition to providing such a product, the nursery has an interest in maximizing greenhouse production over the course of a growing season. However, many efforts to decrease growth cycle time and increase greenhouse productivity have resulted in stock incompatible with nursery handling techniques and ill suited to meet grower requirements.

In summary, a considerable number of drawbacks and problems exist in the art relating to synthetic polymers for use as additives to casings in mushroom production and to growth media for vegetable seedlings, ornamental nursery stock, and sod/turf. Standard cultivation practices define a need for a casing material and/or an amendment which facilitates the ability of the mushroom mycelia to move therethrough and maximizes access to the available water and nutrient supply. Likewise, a support material/growth medium and/or amendment which increases the media retention of water and uptake of nutrients by vegetables, ornamental and floral plants, and sod/turf has been an ongoing concern in the art.

OBJECTS OF THE INVENTION

It is an object of this invention to provide a polymeric system for use as a water and nutrient management agent, overcoming the problems and deficiencies of the prior art, some of which are described above.

It is also an object of this invention to provide, generally, a polymeric system which functions either alone or in conjunction with a growth medium or support material to enhance crop production.

It is also an object of this invention to provide, generally, a polymeric system which functions either alone or in conjunction with a growth medium to enhance crop production, through interaction with and/or promotion of a developing root system.

Another object of this invention is to provide a polymeric system for use during greenhouse production to improve water and nutrient management, reduce cycle times, and increase crop yields.

Another object of this invention is to provide a polymeric system for use with a growing matrix, the system including a non-gelling water-soluble polymer which absorbs and/or retains water and promotes nutrient uptake.

Another object of this invention is to provide a polymer with a cross-linking aspect quantitatively and/or qualitatively less than that which would render it water-insoluble or a gel when used in conjunction with a growth medium or support material.

Another object of this invention is to provide a substantially non-cross-linked polymer which is soluble and/or non-gelling in water at concentrations used with casing, support materials, soils, and related growth media, such that it is dispersible, more or less homogeneously throughout the media, material or soil.

Another aspect of this invention is to provide a substantially linear polymeric system which absorbs moisture, but releases it in amounts sufficient to facilitate and improve uniform growth.

Another object of this invention is to provide a linear, water-soluble polymer and method for use thereof with a variety of growth and nutrient media, such that added water is initially retained upon introduction and subsequently held therein, thereby inhibiting loss through evaporation.

Another object of this invention is to provide a growth medium with enhanced water and nutrient management and related performance properties such that media and nutrient volumes may be reduced and/or used more effectively.

Another object of this invention is to provide a medium and/or support material for mushroom and other agricultural, horticultural crop production, a medium/material having increased water absorbing, retention, and release capabilities, and better able to facilitate nutrient uptake.

Another object of this invention is to provide a medium and method for using such which improves the rate and uniformity of plant/vegetative growth therethrough.

Another object of this invention is to provide a growth medium and/or polymeric system which can be used in conjunction therewith, whereby the polymeric system and/or medium can be synthetically- and/or quantitatively-engineered or modified to meet predetermined performance parameters, notwithstanding other media constituents and physical characteristics.

Other objects, features, and advantages of the present invention may be readily apparent from the following description of the preferred embodiments thereof, taken in conjunction with the accompanying examples and figures.

BRIEF DESCRIPTION OF THE DRAWINGS

FIG. 2 shows graphically total actual pounds (lbs) of mushrooms produced per pound of compost (com), comparing media incorporating a preferred polyacrylamide with controls (lacking polymeric amendments) and demonstrating the increased mushroom number and density available through the present invention;

FIGS. 5–7 graphically illustrate, by comparison—(·) control, (+) 1.0 wt. % P8000, and (*) 0.5 wt. % P8000, reduced loss of water through use of acrylamide homopolymers in conjunction with support materials, in accordance with the present invention and as determined by monitoring combined water and plant weight (DPI-P8000 is the trade name of a substantially linear non-gelling polyacrylamide available from Deerpoint Industries of Hawthorn Woods, Ill.);

FIGS. 8A and 8B show a slight initial emergence delay in tomato seedlings sown in materials containing a preferred polyacrylamide of the present invention—(·) control, (+) 1.0 wt. % P8000, and (*) 0.5 wt. % P8000—but later off-set by enhanced growth with final plant stands comparable to controls;

FIGS. 9A–C graphically illustrate, by comparison, increased tomato plant heights and distributions available under strictly controlled watering techniques and through use of the media of this invention FIG. 9A (control), FIG. 9B (0.5 wt. % P8000), and FIG. 9C (1.0 wt. % P8000);

FIGS. 10A–D graphically illustrate the beneficial tomato seedling weight gain and distribution available under controlled watering conditions and through use of the present invention: FIG. 10A (control), FIG. 10B (0.5 wt. % P8000), FIG. 10C (1.0 wt. % P8000), and FIG. 10D as a corroborative comparison;

FIGS. 11A–C graphically illustrate enhanced growth and development, as gauged by tomato plant height, under variable watering conditions and use of a preferred polyacrylamide of the present invention: FIG. 11A (control), FIG. 11B (0.5 wt. % P8000), and FIG. 11C (1.0 wt. % P8000);

FIGS. 13A–C graphically illustrate, by comparison, increased celery plant heights and distributions available under controlled watering techniques and through use of the media of this invention: FIG. 13A (control), FIG. 13B (0.5 wt. % P8000), and FIG. 13C (1.0 wt. % P8000);

FIGS. 14A–C graphically extend the comparisons of FIGS. 13A–C to the beneficial weight gain and growth of celery available through use of a preferred polyacrylamide of the present invention: (·) control, (+) 0.5 wt. % P8000), and (*) 1.0 wt. % P8000;

FIGS. 15A–B show enhanced growth of tall fescue sod and improved media water retention through use of a preferred polyacrylamide of the present invention—(·) control, (+) 0.5 wt. % P8000, and (*) 1.0 wt. % P8000—supporting the utility of the present invention in conjunction with various well-known biorationals and/or biologicals in the sod/turf industry;

FIGS. 17A–B graphically extend the results shown in FIGS. 15A–C to compare use of a preferred polyacrylamide applied as a 0.1% (w/w) aqueous solution: control, (·) 25 lb. P8000/1000 sq.ft. soil surface, (+) 50 lb. P8000/1000 sq.ft. soil surface, (*) P8000 soln.

FIGS. 18A–B show enhanced nutrient uptake by cauliflower plants grown under commercial greenhouse conditions, though use of a preferred polyacrylamide of the present invention: FIG. 18A, on the basis of weight percent of the indicated nutrient and comparing P8000 (dotted) to a control (cross-hatched); FIG. 18B, results obtained with plants grown with P8000 (dotted) expressed as a percentage of the nutrient uptake by control plans (cross-hatched).

FIGS. 19A–D graphically extend the results summarized in FIGS. 18A–B and show enhanced nutrient uptake of celery plants grown in accordance with the present invention. The comparison is further extended to include celery plants grown in the presence of AQUAMEND®, a gelling superabsorbant polymer of the prior art. FIG. 19A compares the total nitrogen (solid) and nitrate-nitrogen (cross-hatched) analyses. FIG. 19B compares the total weight of plants grown. FIG. 19C compares the average root weight of the plants grown as a gauge of root development. FIG. 19D illustrates various plant development characteristics, by comparative moisture analyses.

SUMMARY OF THE INVENTION

Figure 1A:
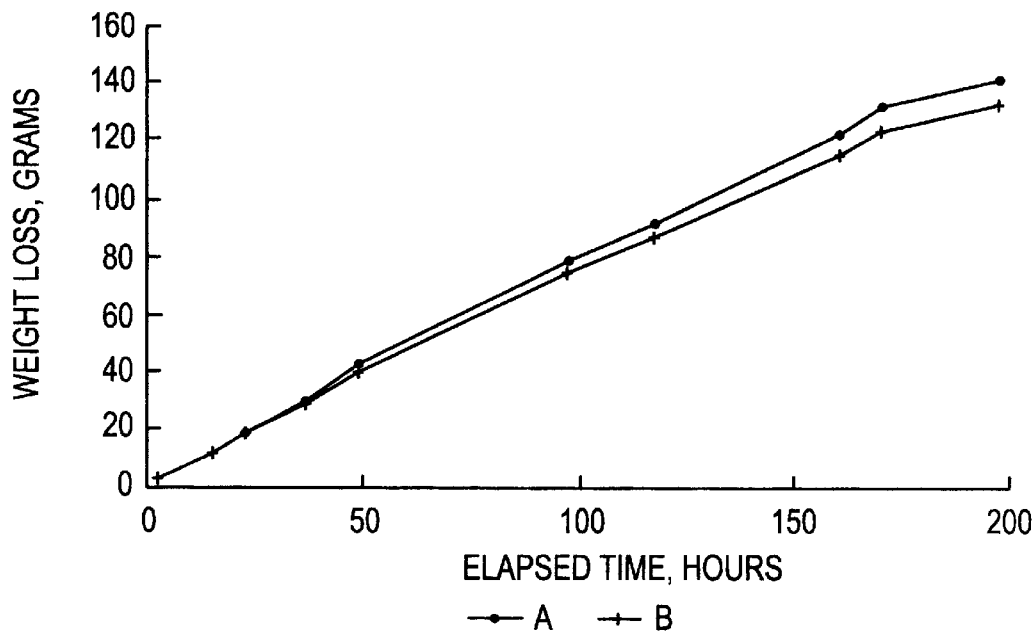
FIGS. 1A–D graphically illustrate, by comparison, weight loss through evaporation of water, showing reduced loss of water through use of polyacrylamides, in accordance with the present invention. Peat moss alone does not reduce evaporation, while an admixture of 1 wt. % homopolymer affords significant reduction.
Figure 1B:
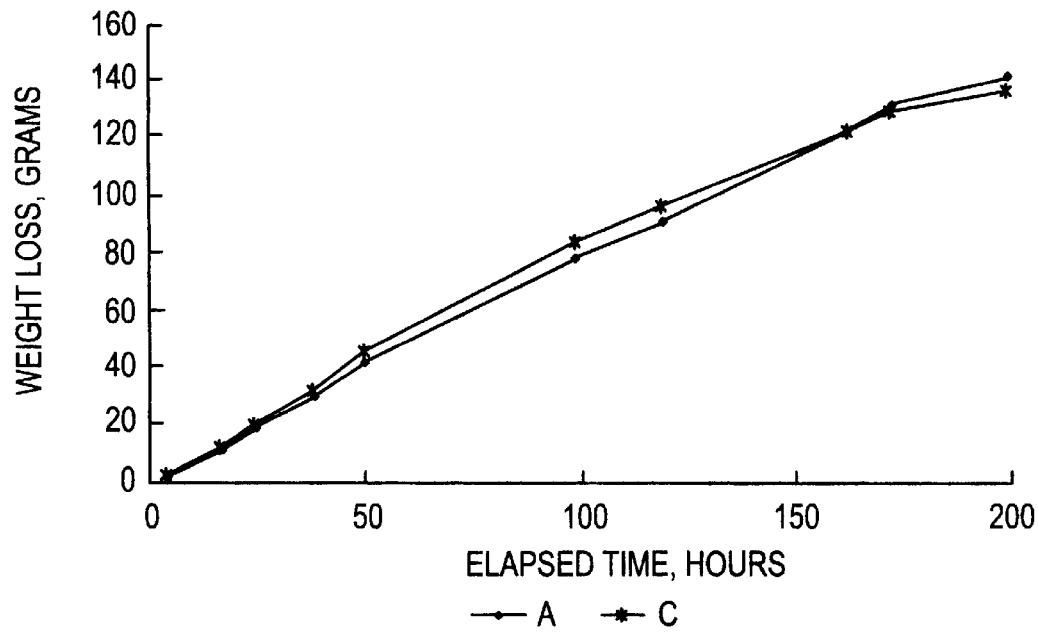
Figure 1C:
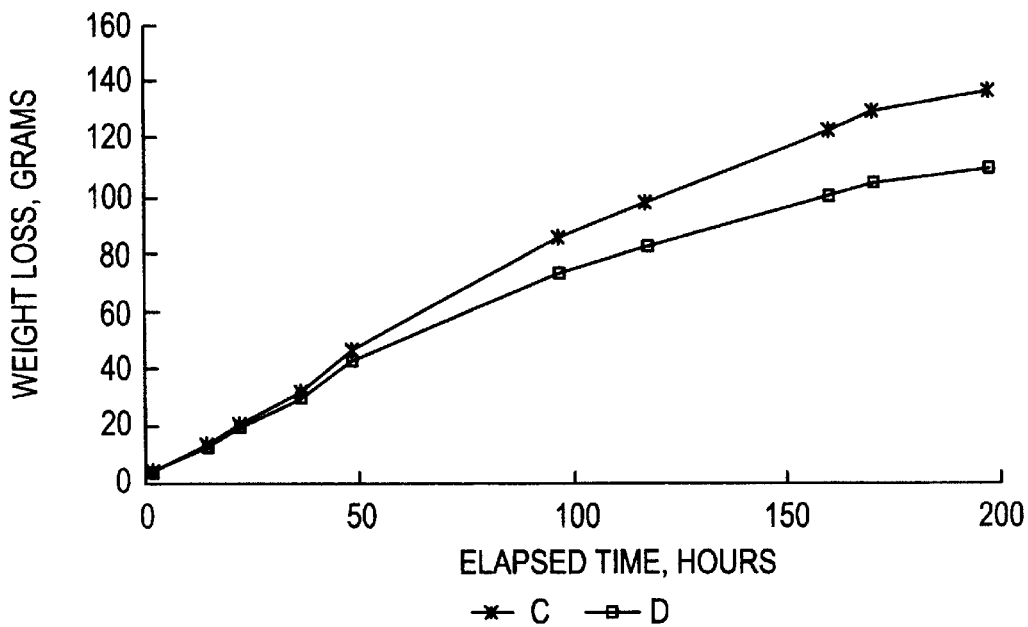
Figure 1D:
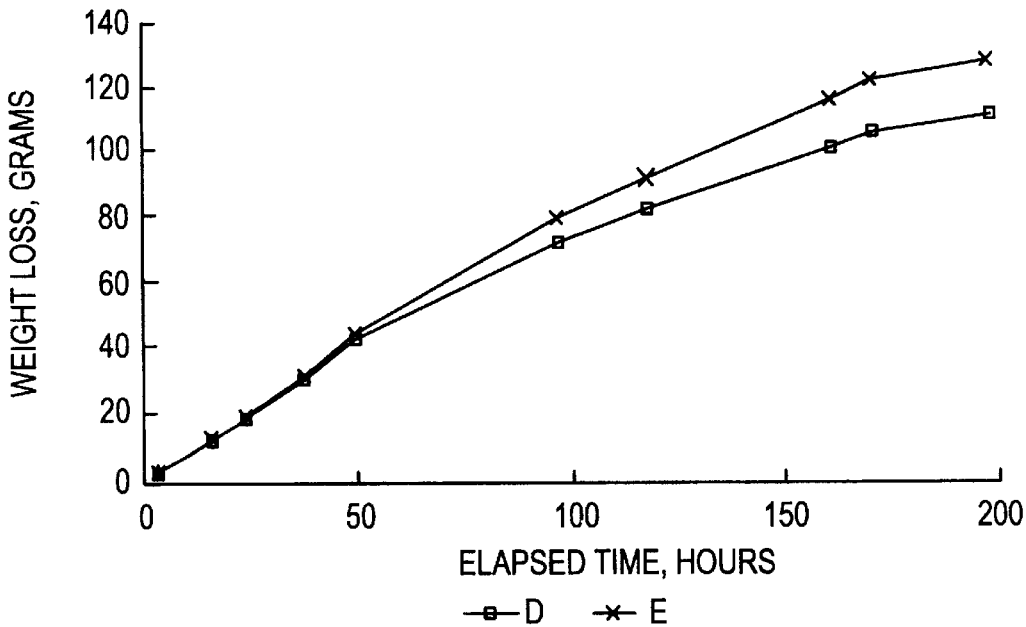

This invention is directed to a medium and/or support material, and method for preparing the same, for enhancing the growth of floral and ornamental nursery and vegetable stock and seedlings, such as peppers, tomatoes, celery, lettuce, cauliflower, and broccoli. The invention overcomes certain well-known problems and deficiencies, including those outlined above. Utilization of the water-soluble, non-gelling polymeric resins described herein enhances plant development and shortens growing cycle time. Through a unique interaction with the support material/growth media, the soluble polymers absorb and retain water and increase nutrient uptake, yet release it in response to seedling growth progression. Size and distribution range can be directed through preferential control of polymer concentration and related media conditions.

In part, the present invention is a medium for enhancing seedling growth and availability of water and nutrients. The medium includes a synthetic resin and a support material. The resin is essentially a substantially-linear water-soluble polymer capable of forming a water-absorbing network with and/or within the support material, such that when dispersed within the material and upon exposure to water, the polymer resin retains water for seedling growth. The polymer is prepared from monomers selected from but not limited to the group consisting of acrylic acid, methacrylic acid, maleic anhydride, and the carboxy functional equivalents of these acids and anhydrides, as well as combinations of the acids, anhydrides, and their functional equivalents. As such, the polymer can be either a copolymer or homopolymer. In preferred embodiments, the water-soluble polymer is a homopolymer of acrylamide.

In preferred embodiments, the polymer is present in an amount equivalent to about 0.1–5.0 weight percent of the medium. In highly preferred embodiments, the polymer, whether a copolymer or a homopolymer, is about 0.5–2.0 weight percent of the medium. The support material used in conjunction with a polymer is selected from but not limited to the group consisting of peat moss, compost, reclaimed compost, field soil, perlite, vermiculite, bark, wood chips, synthetic materials such as polystyrene beads, and polyurethane foam and related sponges, recycled paper and paper products and combinations thereof. In preferred embodiments, a homopolymer of acrylamide is present in an amount equivalent to about 0.1–5.0 weight percent. In highly preferred embodiments, the medium includes one or more of the aforementioned support materials with about 0.5–2.0 weight percent acrylamide homopolymer dispersed therein.

The invention includes a support material for facilitating floral and ornamental and nursery stock and vegetable seedling development. The material includes a synthetic resin dispersed in peat moss, vermiculite or a mixture thereof, as well as other available materials, the resin consisting essentially of a non-gelling, water-soluble acrylamide homopolymer, such that root growth/development and water and/or nutrient uptake are promoted. In preferred embodiments the acrylamide homopolymer is present at about 0.1–5.0 weight percent of the material, which can also include ground limestone or a similar such component for the purpose of effecting pH control and one or more of the various nutrient materials or fertilizers known to benefit plant nutrition. In highly preferred embodiments, the acrylamide homopolymer is about 0.5–2.0 weight percent.

The invention also includes a growth medium/support material for facilitating nutrient uptake. The medium/material includes a synthetic resin dispersed therein, the resin consisting essentially a substantially-linear, water-soluble acrylamide homopolymer. In preferred embodiments, the growth medium/support material is either peat moss, compost, reclaimed compost, field soil, vermiculite, bark, perlite, synthetic sponges or combinations thereof. Likewise, the acrylamide homopolymer is present at about 0.1–5.0 weight percent. In highly preferred embodiments, the material also includes a plant fertilizer and an acrylamide homopolymer present at about 0.5–2.0 weight percent.

In part, the invention includes a method for promoting development of ornamental/floral plants and vegetable seedlings in a support medium, including (1) providing a support material selected from the group consisting of but not limited to peat moss, compost, reclaimed compost, field soil, bark, vermiculite, synthetic sponges, perlite and combinations thereof; (2) dispersing within the support material a substantially linear water-soluble polymer capable of forming a water- and nutrient-retaining network within the support material; and (3) applying water to the support material such that the water and nutrients are absorbed by the polymer and support material for subsequent release responsive to plant growth. As described in conjunction with the media and support materials of this invention, the water-soluble polymer used in conjunction with the method is prepared from monomers selected from the group consisting of acrylic acid, methacrylic acid, maleic anhydride, carboxy functional equivalents of the acids and anhydrides, and combinations of the acids, anhydrides, and their functional equivalents. The method can be employed whether the water-soluble polymer is a copolymer of at least two monomers or a homopolymer. In preferred embodiments, the method utilizes but is not limited to a mixture of peat moss and vermiculite as a support material with acrylamide homopolymer dispersed therein, whether or not the peat, vermiculite or other support material has associated with it a moisture component. The water-soluble polymer can be dispersed within the support material by physical mixing. Alternatively, the polymer is dissolved in water and dispersed within the material as an aqueous solution.

As discussed above, the polymeric resins of this invention improve the water and nutrient management characteristics of a support material, whether the material derives from compost, recycled compost, peat moss, synthetic sponges, field soil or any combination of these and others. The polymers absorb and, more importantly, make water and nutrients more available during plant growth. The advantages available through use of this invention are best realized through a homogeneous dispersion of such a polymer throughout the support material. Uniform polymer distribution, in turn, provides an even supply of water and nutrients throughout the material, thereby promoting uniform growth rates throughout. The polymer can be admixed with the material or introduced thereto by way of an aqueous solution. While both introductory routes may be employed with beneficial effect, best results are obtained by admixing dry polymer to dry or slightly moistened support material. As shown in the examples of the invention which follow, the beneficial effect can be observed directly by the increased water retention of the growth media and by a reduction in loss of water due to evaporation.

With respect to mushroom cultivation and from a practical, economic standpoint, increases in the water retention capacity of the casing can decrease the amount of casing required by about one-third, as reflected in a 1.5" versus 1.0" layer over a compost base, without loss of yield. As described more fully below and through the examples of the invention, yields are enhanced with a decrease in casing volume. In as much as the casing material represents a significant portion of production costs, volume reduction through use of the invention provides a decided economic benefit not otherwise available. Even if casing volumes are not reduced the polymers described herein can be employed, nonetheless, to increase water loads and overall mushroom density, size and yields. As further described in the examples which follow, and with reference to the preferred acrylamide homopolymer, maximum yields are observed at a dosage of 1.0 weight percent, as used in conjunction with a peat depth of 1.5". In addition to increased yield, an increase in mushroom size (large and medium) is also observed, with a corresponding decrease in small size and opens. A dosage of 0.5 weight percent (1.5" depth, peat) is not observed to impact yield significantly. At dosages of 2.0 weight percent and greater (1.5" depth, peat) overall yields are observed to decrease slightly versus the control. However, at these higher concentrations there is a relative increase in mushroom size (large and medium), similar to that observed at a 1.0 weight percent dosage.

The methodology employed to generate the data discussed above did not include a preferred picking technique by which the casing material is periodically "scratched" to accelerate the growth process, as manifested through higher yields and a larger product distribution in the medium and large mushroom size range. The results observed indicate yields and relative distributions to the large and medium size ranges would be enhanced even further through implementation of this technique. Even so, production is markedly improved without scratching and the associated costs of manual labor.

In contrast to mushroom production, the key economic advantage in ornamental nursery and vegetable production, through use of the inventive polymers and media described herein, is reduced cycle time in the greenhouse or sod farm as a result of faster, more vigorous plant growth. Through more efficient water management, usage, and control, and more efficient fertilizing practices, the cost per plant is reduced significantly.

With respect to mushroom production, and as further illustrated in the following examples, at reduced casing volumes (1.0" depth, peat) the optimum dosage range for the preferred acrylamide homopolymer is about 0.5–1.0 weight percent. At a dosage of 0.5 weight percent (1.0" depth, peat) significant increases in yields are realized with distribution directed toward the larger size ranges. At a dosage of 1.0 weight percent (1.0" depth, peat), significant increases in yields are also observed, in addition to an extremely large increase in the relative number of large-sized mushrooms. At dosages of 2.0 weight percent and greater, yields decrease relative to the control. As observed with use of the polymers of this invention with normal peat volumes (1.5" depth, peat) higher polymer concentrations direct the product distribution to the larger size ranges. This effect by the preferred acrylamide homopolymer is more pronounced at reduced casing volumes (1.0" depth, peat).

Consistent with the results obtained from previous mushroom trials, the optimum dosage range for the preferred acrylamide homopolymer is about 0.5–1.0 weight percent, for use in conjunction with the growth and development of tomato and related vegetable seedlings. However, with plants such as celery having higher water requirements, the optimal dosage may approach 2.0 weight percent. Generally, more pronounced results are obtained through use of higher weight percent dosages, as evidenced through denser foliage with larger, hardier leaves having a darker green coloration. Likewise, the seedlings have thicker stalks and more developed root systems able to better withstand the trauma associated with handling, shipping, and transplanting.

In addition to the support materials previously mentioned, various other materials and mixtures are commercially available, as known to those skilled in the art made aware of this invention, including the Cornell Peat-Lite mixes, the U.C. mixes, the Vineland Research Fertilizer, Sphagnum Peat Moss and Vermiculite Mixture, and other mixes and components thereof, such as those described in Resh, *Hydroponic Food Production: A Definitive Guide Book of Soilless Food Growing Methods*, 3rd Ed., Woodbridge Press Publishing Company, 1985, incorporated herein by reference in its entirety, Chapter 9 in particular.

In contrast to the superabsorbants of the prior art, the polymeric resins and growth media of the present invention can be used advantageously in conjunction with a variety of nutrients and fertilizers. Introduction of these components into the media and/or support materials of the present invention do not adversely affect the water retention properties of the inventive polymeric resins. The identity and concentration of any particular nutrient and/or fertilizer is specific to the ornamental or vegetable seedling under consideration and is often dependent upon economic factors. Without limiting the scope of this invention, various commercially available nutrients and/or fertilizers together with their representative concentrations, are as provided in Lorenz, et al. *Handbook for Vegetable Growers*, 3rd Ed., John Wiley and Sons, 1988, incorporated herein by reference in its entirety.

As described above, the present invention includes use of substantially linear, water-soluble polymeric resins to manage the uptake, retention, and release of water to seedlings during mushroom growth. As used herein, the term substantially linear encompasses some degree of cross-linking between polymeric chains, but less than that inherent to the hydrogel superabsorbant polymers of the prior art and less than that which would render the polymers of this invention water insoluble under and about the range of use conditions described herein. The water solubility of such polymers promotes homogeneous dispersion throughout the support material, thereby ensuring an even water load throughout such that uniform growth is achieved. Having a substantially linear morphology, as contrasted to the extensive, three-dimensional cross-linking of the superabsorbants, it is surprising that these polymers retain water as well as and often better than the superabsorbant cross-linked polymers of the prior art. (See Table 4.) However, unlike superabsorbant polymers the linear non-gelling polymers of the present invention release the retained water in response to seedling growth. As such, they are readily distinguished over the insoluble cross-linked polymers which, due to their inherent high-gel strength, appear to compete for moisture during the entire growth cycle.

Polymers meeting the above requirements include, without limitation, acrylic acid homopolymers and copolymers thereof with methacrylic acid, maleic anhydride, and the like. Various other alkyl-substituted derivatives of such monomers may be incorporated into the polymer, with equal effect, so long as the water-solubility and linear morphology requirements are met. The carboxy functionalities of such co- and homopolymers can be modified to meet various performance requirements, without deviating from the scope of this invention. The acid esters, acid salts, amides and other synthetic equivalents of the carboxy functionality can be incorporated into the polymeric material to provide a variety of anionic, cationic, and non-ionic resins. Synthetic equivalents are those which upon hydrolysis or a similarly-directed chemical reaction provide the carboxy functionality. The synthetic equivalents can be further chemically-modified to meet certain physical and performance requirements. For example, an especially useful cationic resin is a co- or homopolymer of acrylamide, wherein the amide moiety is treated in succession with formaldehyde/formalin, then a trialkylamine to provide a Mannich-type quaternary amine (Mannich Quat).

The efficacy of these linear, water-soluble polymers as water and nutrient retention agents was demonstrated as shown in the examples and tables provided below. Under conditions simulating the addition of water to a growth medium, materials containing a dispersion of such polymers performed in accordance with the invention, in contrast to insoluble and/or non-absorbing resins. Water retention/evaporation inhibition is a critical factor in the consideration of a usable media amendment. The preliminary water loss results and the observed uniform dispersion were confirmed by the enhanced yield and size distribution recorded. (See Example 5).

The polymers described as part of this invention would not seem appropriate for use in growth media. It is conventional wisdom that because linear water-soluble polymers do not form water-absorbing gels, they are restricted to use as soil conditioners, by way of aggregating the soil, combating erosion and/or improving percolation. It would seem improbable that such polymers could be employed effectively to promote mushroom growth and development. The use of linear, water-soluble polymers in this manner and as disclosed herein is contrary to the state of the art, and the results obtained were quite unexpected. Without advancing any one theory or explanation it appears that these polymers when used with support materials sufficiently absorb water, but not to the extent as do their cross-linked hydrogel counterparts. Rather, water and nutrients are released responsive to osmotic pressures generated as a result of seeding/nursery stock growth. In addition, without limiting the invention, it is thought that linear polymer morphology within the casing or support material functions as a template or network for mycelia or root growth. Increased availability of water provides for greater mushroom yields and larger size distribution, as well as enhanced growth and reduced cycle time, in the context of nursery stock.

The following non-limiting examples illustrate these and other features of the invention.

EXAMPLES OF THE INVENTION

Example 1

Various polymers (Poly A-I, below) were evaluated under conditions simulating the water retention ability of commercial growth media and/or materials used for mushroom, ornamental, and vegetable production to determine their potential as media growth amendments, specifically as water management agents.

The methodology included the following steps: (1) control was established using 100 grams of peat moss and 300 grams of water to reproduce adding an excess amount of water to the peat. Peat moss of the type used herein and by commercial mushroom growers ornamental nurseries, vegetable nurseries and sod/turf farmers can be obtained from Lakeland Peat Moss, Ltd. of Edmunton, Alberta, Canada under the designation, Lakeland Professional Grower Bale, Canadian Sphagnum Peat Moss. The control was allowed to hydrate for 18 hours to assure maximum uptake (swelling) of the peat with water; (2) the subject polymers were evaluated by substituting 1 gram of polymer solids for 1 gram of peat, to provide a 1% polymer addition rate, based on dry weight of peat. For example, a typical polymer candidate of 100% polymer solids was evaluated in a mix consisting of: 99 grams peat, 1 gram polymer, and 300 grams water. For polymers having less than 100% solids, correspondingly more polymer was added to reach the 1% loading (of polymer solids) to dry weight of peat. Each polymer/peat/water mixture was also allowed to hydrate for 18 hours. (See description of control and Poly A-Poly I, below); (3) after hydrating for 18 hours, each test sample was gravity filtered to determine excess water, if any, not retained by the peat/polymer medium. A porous filter paper permitted the water-soluble, high molecular weight polymers to pass through the paper if not retained in the peat/polymer/water medium to allow determination of the suitability of each polymer candidate as a water retention agent; and (4) excess water, not retained within the peat/polymer/water medium by each subject polymer was weighed, then subtracted from the total weight of water originally added to the mixture to obtain "retained water." Percent retained water was calculated by comparing "retained water" by total water initially added to the system.

The media compositions and results derived therefrom (Table 1) are as provided below:

CONTROL
  100 grams peat
  300 grams water
POLY A
  99 grams peat
  1 gram high molecular weight (~15,000,000) linear polyacrylamide
  300 grams water
POLY B
  99 grams peat
  1 gram high molecular weight (~12,000,000) linear polyacrylic acid
  300 grams water
POLY C
  99 grams peat
  78.9 grams of 3.8% high molecular weight (~15,000,000) linear polyacrylamide Mannich Quat (formaldehyde/trimethylamine) dissolved in water
  212.1 grams water
POLY D
  99 grams peat
  1 gram polyethylene glycol (PEG 3350, MW ~3,350)
  300 grams water
POLY E
  99 grams peat
  1 gram medium molecular weight (~150,000) polyvinyl alcohol
  300 grams water
POLY F
  99 grams peat
  2 grams high molecular weight (~20,000,000) linear acrylamide/sodium acrylate copolymer (latex emulsion; 50% polymer solids)
  1 gram ethoxylated (9 mole) nonyl phenol (inversion agent)
  298 grams water
POLY G
  99 grams peat
  3 grams low molecular weight (~10,000) linear sodium acrylate polymer (30% polymer solids)
  298 grams water
POLY H
  99 grams peat
  1 gram high molecular weight (~12,000,000) linear acrylamide/sodium acrylate copolymer
  300 grams water
POLY I
  99 grams peat
  1 gram (Superabsorbant) high molecular weight (~15,000,000) highly cross-linked gel-forming sodium acrylate polymer
  300 grams water

TABLE 1

| Polymer | Water Retention (%) | Polymer | Water Retention (%) |
| --- | --- | --- | --- |
| CTRL | 61 | Poly E | 64 |
| Poly A | 100 | Poly F | 100 |
| Poly B | 100 | Poly G | 72 |
| Poly C | 100 | Poly H | 100 |
| Poly D | 67 | Poly I | 89 |

The results show that the polymers/media/casing materials of the present invention retain an initial load of water significantly better than those of the prior art. Retention characteristics are crucial to successful mushroom, ornamental plant, vegetable and sod/turf production. In contrast and under the experimental conditions described above, it was observed that Poly D and Poly E (polyethylene glycol and polyvinyl alcohol) performed only marginally better than the peat moss control without a polymeric amendment. Likewise, the superabsorbant/hydrogel of the prior art (Poly I) retained less water than the water-soluble linear polymers. The performance of Poly G is attributable to the relatively low molecular weight. Without limiting the invention, linear polymers having molecular weights greater than about 100,000 appear to provide the preferred combination of chain length and water solubility, while those above 500,000 are highly preferred from both a practical and performance perspective.

Example 2

Using a methodology similar to that described in Example 1, (six hour hydration period; percent water retention measured after one-half hour via gravity filtration), various amounts (weight percentages) of a preferred polyacrylamide homopolymer were mixed with peat moss to determine the effect on media/material water retention. As shown in Table 2, below, the polyacrylamide-enhanced water retention of the matrix versus the control at 0.5, 1.0, and 1.35 weight percent, the latter tested with a 25% reduction in peat volume.

SAMPLE A (CONTROL)
  80.0 grams peat
  120.0 grams water
SAMPLE B (0.5% polyacrylamide based on dry peat moss)
  79.6 grams peat
  0.4 grams polymer
  120.0 grams water
SAMPLE C (1.0% polyacrylamide based on dry peat moss)
  79.2 grams peat
  0.8 grams polymer
  120.0 grams water
SAMPLE D (peat reduction with 1.35% polyacrylamide based on dry peat moss)

59.2 grams peat
0.8 grams polymer
120.0 grams water

TABLE 2

| Sample | Water Ret (%) |
|---|---|
| A | 87.3 |
| B | 94.8 |
| C | 100 |
| D | 96.1 |

Example 3

Evaporation of moisture from casing material is a significant impediment to Step 4 mushroom mycelia growth, as well as greenhouse production of ornamental stock and vegetable seedlings in related support materials. To illustrate the ability of the water-soluble polymers of this invention to retain water and reduce evaporation, water/polymer/peat mixtures were evaluated against water, water/polymer, and water/peat controls. Each of Samples A–E, below were placed in tared polyethylene dishes (5" depth), kept at room temperature and weighed periodically over a 200-hour period. Incremental weight loss (grams) comparisons are shown graphically in FIGS. 1A–D. Final weight loss (198 hours/8.25 days) comparisons are provided below.

TABLE 3

| Sample | % wt. loss |
|---|---|
| A | 94.9 |
| B | 88.8 |
| C | 91.6 |
| D | 73.4 |
| E | 84.9 |

Sample A (Water Control)
  150.0 grams water
Sample B (Water/Polyacrylamide Control)
  75.0 grams 2% polymer in water
  75.0 grams water
Sample C (Water/Peat Control)
  150.0 grams peat
  150.0 grams water
Sample D (Water/Peat/Polyacrylamide)
  148.5 grams peat
  1.5 grams polymer
  150.0 grams water
  (1% polymer based on dry wt. of peat)
Sample E (Water/Peat/Polyacrylamide)
  148.5 grams peat
  75.0 grams of 2% polymer in water
  75.0 grams water
  (The 75.0 grams of polymer in water was poured on top of the peat after the first 75.0 grams of water was added.)

Comparison of Samples A and B (see FIG. 1A) demonstrate the colligative effect of water through introduction of a polymeric solute. Comparison of Samples A and C (FIG. 1B) shows peat moss, alone, does not significantly reduce the extent and rate of evaporation.

Samples C and D (FIG. 1C) demonstrate that solid acrylamide homopolymer (1%) admixed with dry peat affords a significant evaporation reduction. Comparison of Samples D and E (FIG. 1D) shows the additional benefit from dry polymer admixture, rather than by way of an aqueous solution, even though evaporation in the later (Sample E) is still reduced compared to peat moss, alone (Sample C).

Example 4

A substantially-linear (non-cross-linked non-gelling) polyacrylamide (available under the trade name DPI-P8000 from Deerpoint Industries of Hawthorn Woods, Ill., as known to those skilled in the art) was tested against a number of commercially-available "superabsorbant" polymers, all of which are structurally characterized as being highly cross-linked and gel-forming, by way of comparing water retention properties. All comparisons were conducted using 1:1 (w/w) peat and water. The control was composed of peat and water, only. All of the samples were prepared using 1% (by wt. of peat) of the polymer indicated. Water retention was determined by % wt. loss, under the conditions specified in Example 3, after 261 hours. The following results confirm that the water retention capabilities of a representative polymer of this invention are comparable to those capabilities of prior art polymers.

TABLE 4

| Sample | % Wt. Loss |
|---|---|
| A | 93.3 |
| B | 85.7 |
| D | 81.9 |
| 1 | 80.6 |
| 8 | 80.7 |
| 11 | 83.3 |
| 12 | 85.3 |

Sample A (CONTROL)
Sample B (DPI-P8000, linear polyacrylamide)
Sample D (HYCHEM AP200A Coarse/large particle-size, Cross-Linked Sodium Polyacrylate)
Sample 1 (HYCHEM AP200C Fines/large-particle-size, Cross-Linked Sodium Polyacrylate)
Sample 8 (STOCKHAUSEN 400K Normal/medium particle-size, Cross-Linked Potassium Polyacrylate)
Sample 11 (STOCKHAUSEN 400F Fines/small particle-size, Cross-Linked Potassium Polyacrylate)
Sample 12 (STOCKHAUSEN 410K, Cross-Linked Potassium Polyacrylate)

Example 5

Figures 3A, 3B:
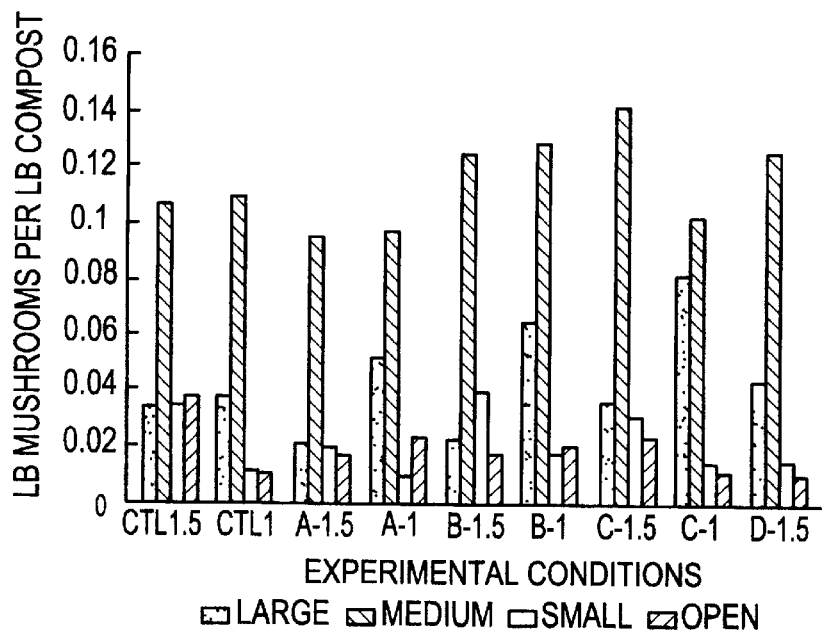
FIG. 3 graphically extends the comparisons of FIG. 2 to size distribution in terms lbs. of mushrooms per lb. of compost—showing distribution, generally, directed to the larger size ranges, as discussed below.
Figures 4A, 4B:
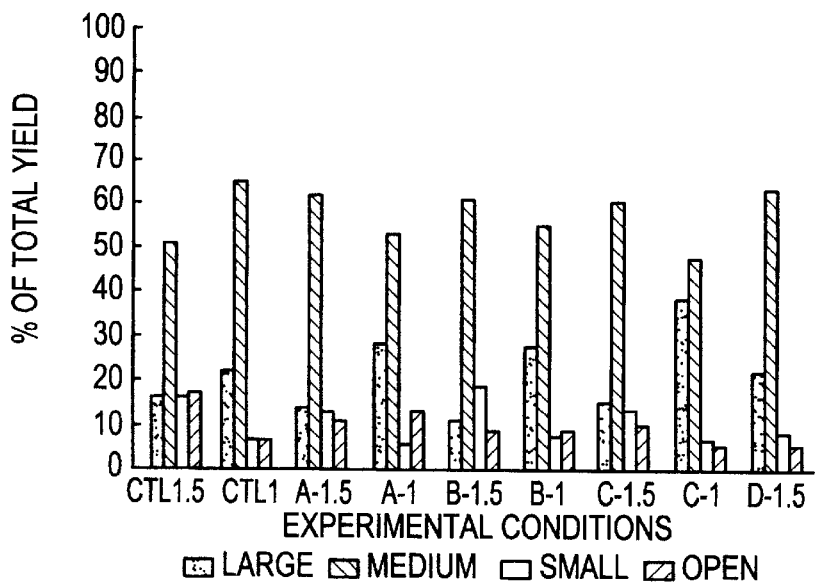
FIG. 4 further extends the comparisons of FIG. 2 and 3 to size distributions in terms of percentage of total yield.

Extending the evaporation/water retention studies discussed above, field trials were conducted on trays of spawn-run compost, using peat moss casing at uniform depths of 1.0 and 1.5". Controls of (CTL) peat alone were compared against casing prepared with varying concentrations of a preferred substantially linear acrylamide homopolymer dispersed manually within the peat moss, although other acceptable mixing techniques may be used. (The subject polymer may be dispersed mechanically, either dry or by way of an aqueous solution, through use of a polymer eductor or a similar type of device, as well-known to those skilled in the art.) With reference to the test tray descriptions, below, the total pounds of mushrooms produced, actual yield by size, and percent yield by size are provided in FIGS. 2–4, respectively. All other experimental parameters were maintained as constant throughout and as between the trays, including water volume and frequency. Scratching techniques were not implemented but would be expected to increase yields and size distribution. The total poundage of mushrooms picked in three (3) breaks was divided by the total net weight of compost used for those trays. Likewise, actual yields (by size) were calculated with reference to the net weight of compost. Percentage of yields by size were normalized to 100% irrespective of total actual yields. Tests A-1 and A-1.5 were conducted using polyacrylamide sprinkled on the compost base, as compared to mixing uniformly through the casing medium. Consistent with the results summarized in Examples of 1–4, use of preferred linear polyacrylamide produced more mushrooms of greater size and density and improved size distribution.

TABLE 5

TEST TRAY DESCRIPTIONS FOR FIGS. 2–4

| KEY | DESCRIPTION | PEAT DEPTH |
|---|---|---|
| CTL1.5 | peat control, no polymer | 1.5" |
| CTL1 | peat control, no polymer | 1" |
| A-1.5 | 1% on compost, polyacrylamide | 1.5" |
| A-1 | 1% on compost, polyacrylamide | 1" |
| B-1.5 | 0.5% in peat, polyacrylamide | 1.5" |
| B-1 | 0.5% in peat, polyacrylamide | 1" |
| C-1.5 | 1.0% in peat, polyacrylamide | 1.5" |
| C-1 | 1.0% in peat, polyacrylamide | 1" |
| D-1.5 | 2.0% in peat, polyacrylamide | 1.5" |
| D-1 | 2.0% in peat, polyacrylamide | 1" |

Example 6

Based on the results from the evaporation/water retention studies summarized in Examples 1–4, above, field trials were conducted on multiple-cell trays planted with tomato seeds. A support medium of 50:50 (v/v) for vermiculite and peat was prepared and mixed with a recommended amount of a commercial nitrogen/potassium/phosphorous fertilizer and evenly distributed among the 50 cells of the control tray and each of two test trays. The support material in one test tray included 0.5 weight percent of a substantially-linear (non-cross-linked) polyacrylamide (available under the trade name DPI-P8000 from Deerpoint Industries of Hawthorn Woods, Ill.). The second tested tray included 1.0 weight percent of the same polyacrylamide, likewise evenly distributed throughout the support material and among the individual tray cells. Each cell of the control and test trays was sown with a tomato seed and subjected to identical (amount and time interval) watering conditions over a 9-week period. Each cell was administered 5.0 milliliters of water at the times indicated in the corresponding figures. The total weight of each tray was measured before and after watering.

Figure 6:
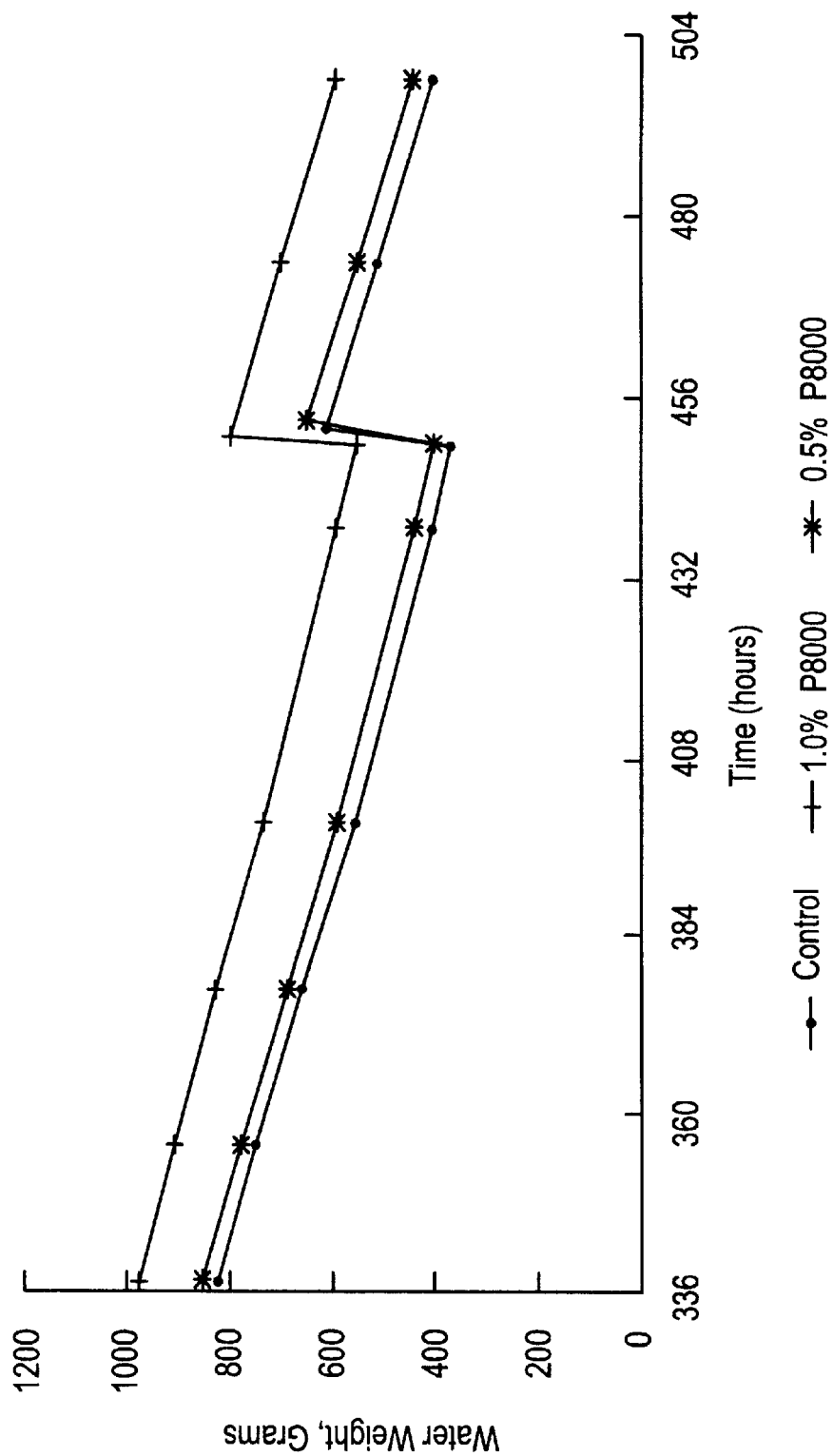
Figure 7:
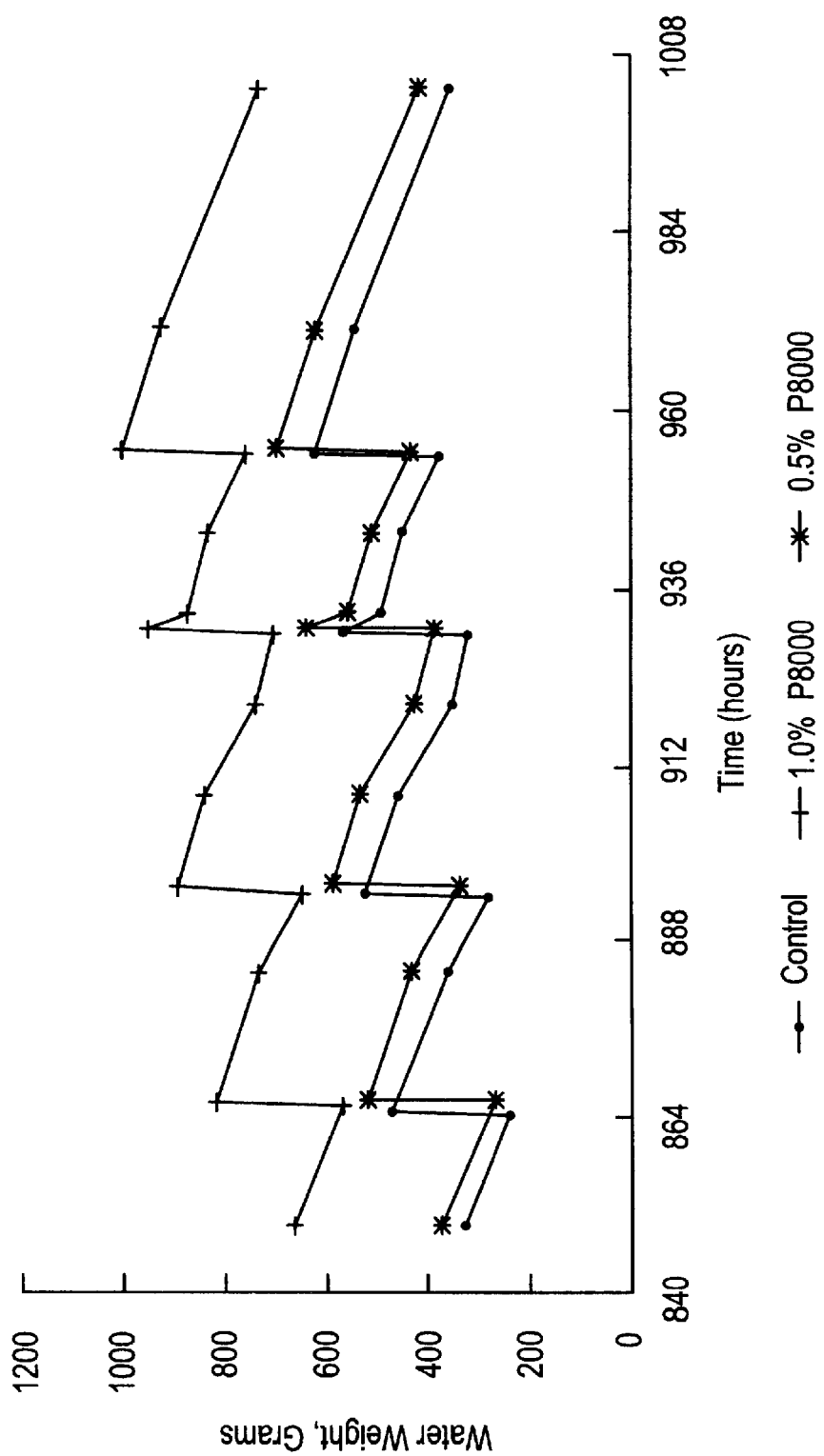
Figure 8B:
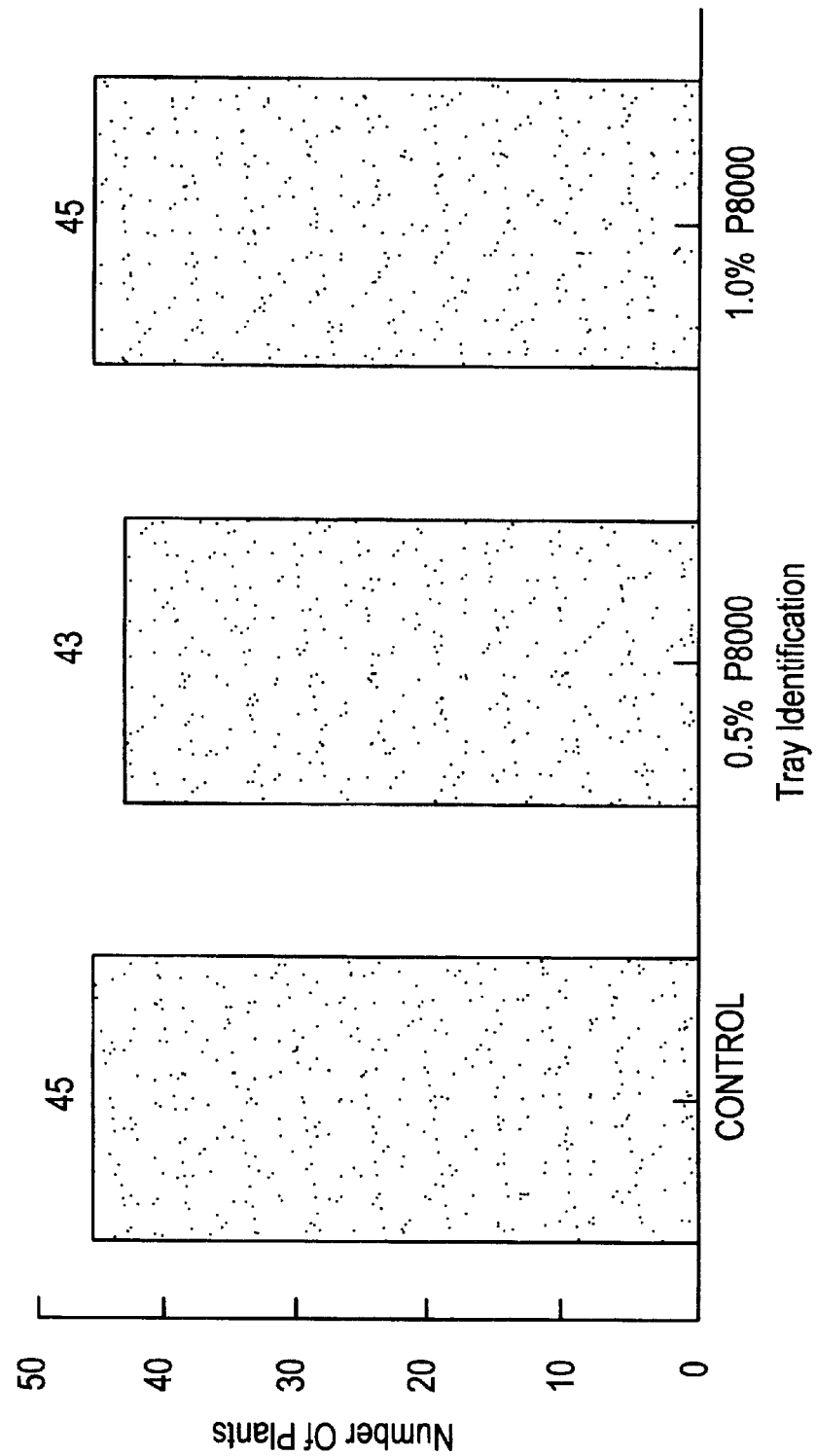

Consistent with the findings summarized in Examples 1–4, the polyacrylamide growth amendment of this invention exhibited water retention. FIGS. 5, 6, and 7 track the total water and plant weight over time and show the relative water levels and losses associated with each of the control and test trays during weeks 1, 3, and 6, respectively of the trial of this example. The spikes shown represent the weight gain measured upon water administration. The water retention capabilities of the inventive linear polymer were also manifested through an initial slight delay in seedling emergence. See, FIG. 8A. Without limiting the scope of this invention and without restriction to any one theory or interpretation, the delay in seedling emergence can be explained by a slight increase in surface crusting of the support material. Alternatively, during early stages of development, seedling growth is concentrated in the root system, rather than directed toward surface emergence-presumably because of increased water availability. However, this initial delay was more than offset by enhanced growth and vigor, and final plant stands were statistically identical to the control. See, FIG. 8B.

Example 7

The tomato seedlings grown as described in Example 6, were observed throughout the test period and observed/ evaluated after nine weeks. The control seedlings, grown without the benefit of a substantially-linear water-soluble polymer were shorter and less-developed than those seedlings grown in a support material including the inventive polymer. Generally, the control plants were less vigorous, as portrayed through the reduced height, weight and girth and foliage amount and coloration. The control plants were observed to average between 3–4 inches in height, as compared to an average of 4–5 inches (0.5 weight percent linear polyacrylamide) and greater than 5–6 inches in height (1.0 weight percent linear polyacrylamide) observed with the test trays. As compared to the control, the seedlings grown in the inventive media exhibited denser foliage with larger, heartier leaves having a darker green color. In addition, the test tray seedlings were sturdier through the development of thicker stalks. The improvements shown provide a heartier, more robust seedling better suited for handling, shipping, and transplanting. In addition, enhanced growth and development shortens nursery cycle time, providing commercial growers the opportunity for increased productivity and profits.

Figure 9C:
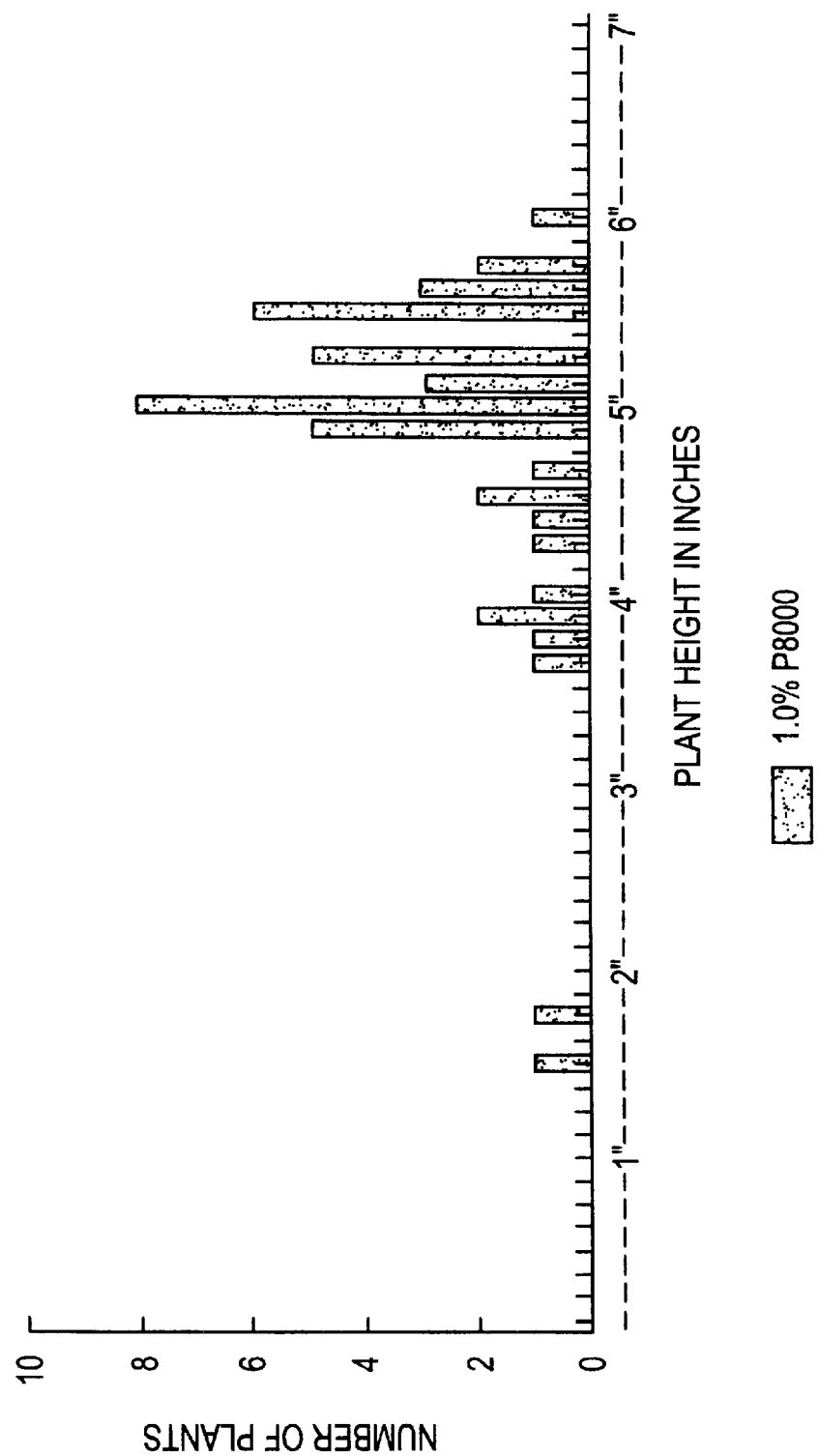

After nine weeks, the tomato seedlings grown in the control and test trays were measured with the heights recorded as shown in FIGS. 9A–C. As shown therein, a greater number of seedlings grew taller in the inventive media and as the weight percent of linear polyacrylamide therein was increased.

Figure 10A:
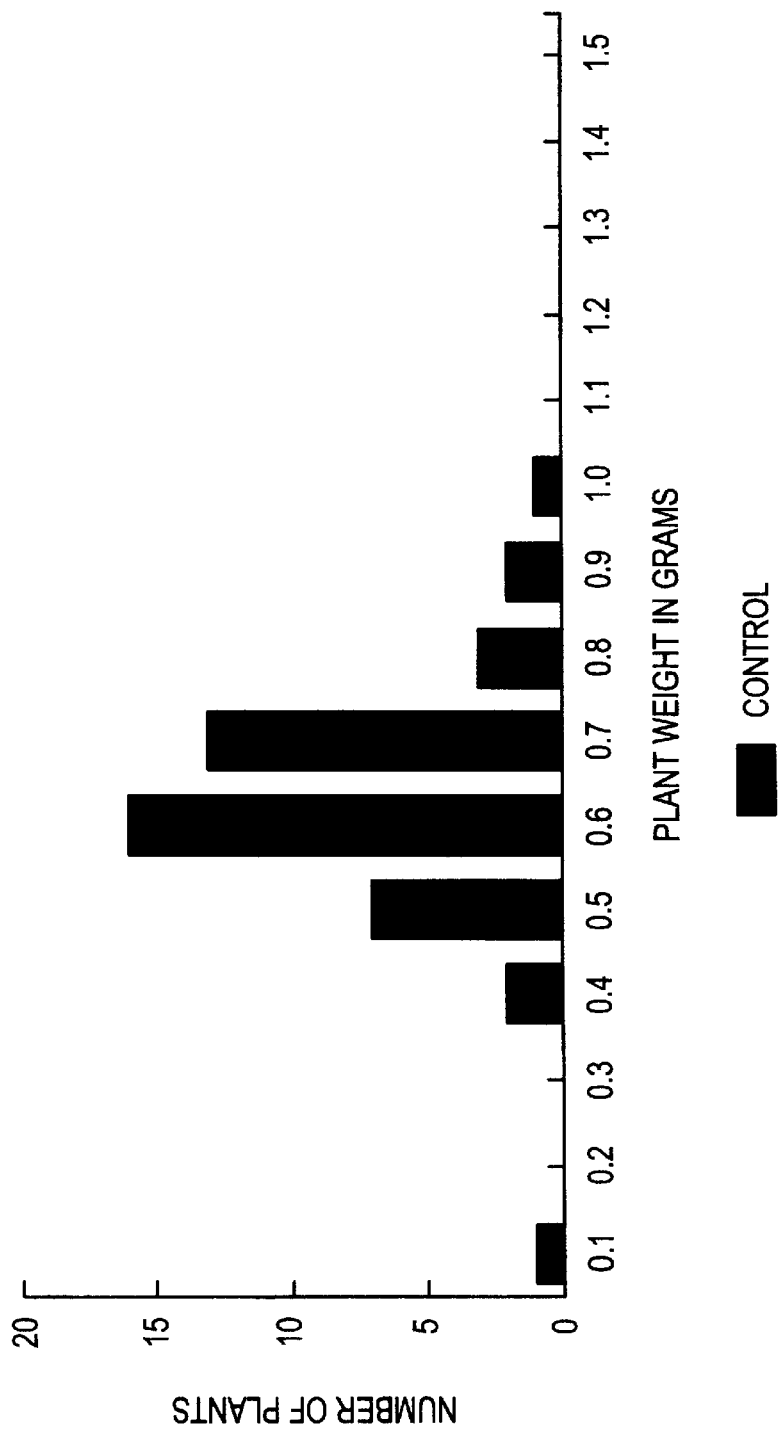
Figure 10B:
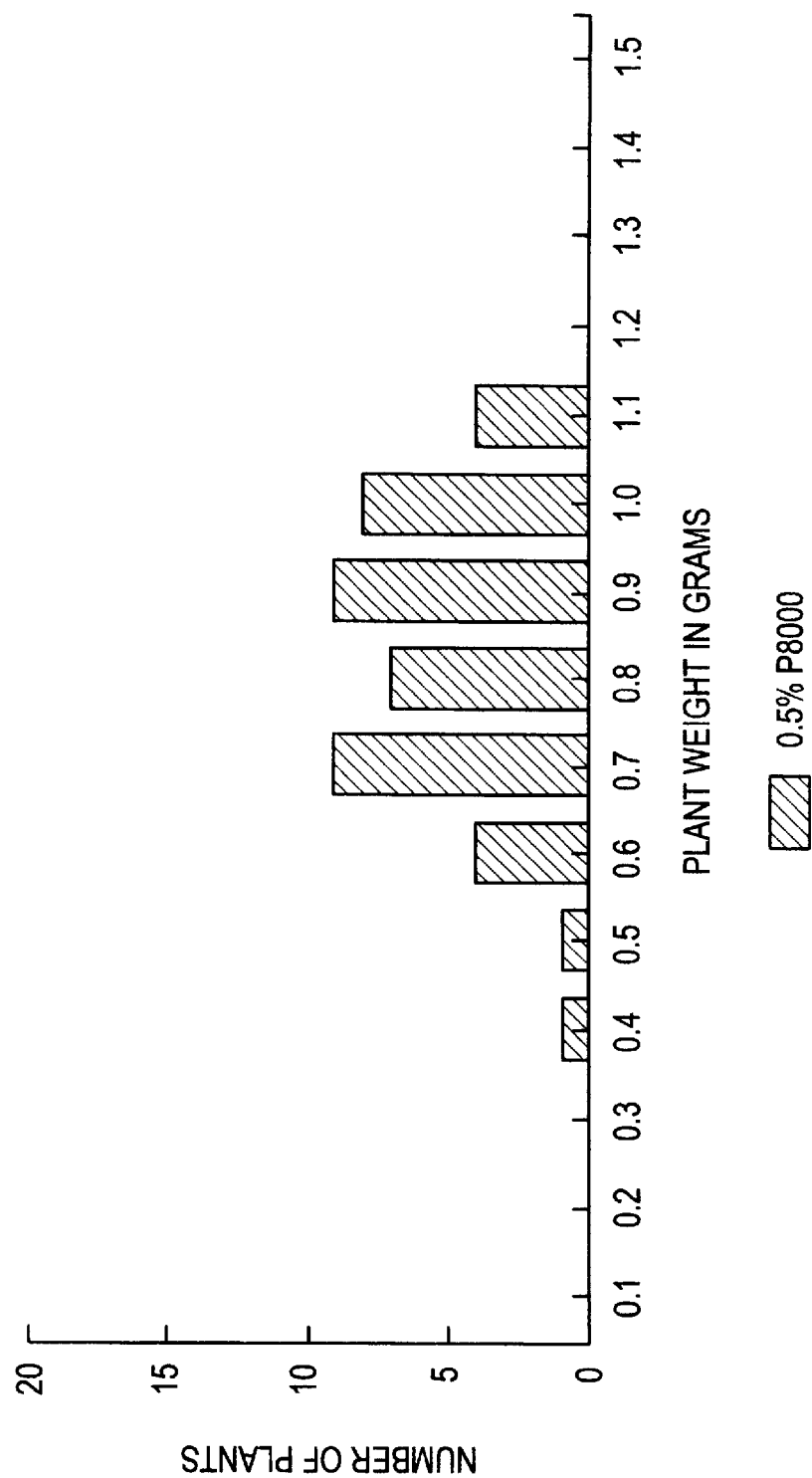
Figure 10D:
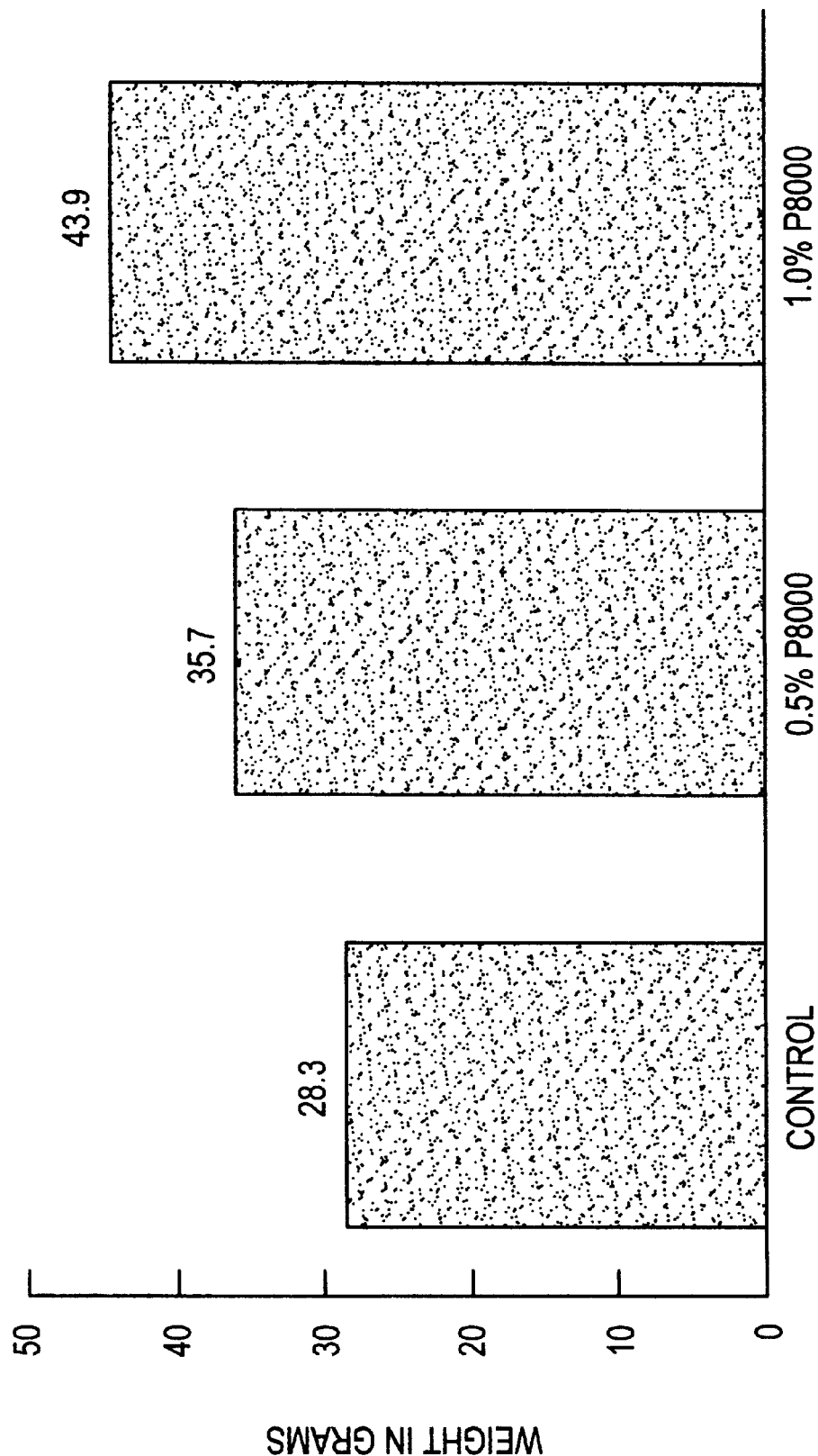

After the heights were recorded, the portion of each plant above the surface was cut and weighed as a further measure of development. FIGS. 10A (control), 10B (0.5 weight percent polymer), and 10C (1.0 weight percent polymer) show and compare the weight distributions determined. Generally, a greater number of plants weighed more as a result of being grown in the inventive media. To some degree, as also shown through height measurements, seedlings grown in the presence of 0.5 weight percent linear polyacrylamide show a more uniform distribution within the relevant range. An increase in polymer concentration to 1.0 weight percent results in a significant increase in the number of taller and heavier seedlings. As shown in FIG. 10D, the total combined weights of the plants of FIGS. 10A, 10B and 10C confirm these results. The plants of the test tray incorporating 1.0 weight percent polymer weigh about 51% more than the plants of the control test tray and about 22% more than the plants of the test tray incorporating 0.5 weight percent polymer.

Example 8

As described in Example 6, a 50:50 (v/v) mixture of vermiculite and peat was prepared. The mixture was evenly distributed among each of 72 cells in a control tray; each cell was sown with one tomato seed. One test tray was prepared admixing 0.5 percent dry weight P8000 linear polyacrylamide to the vermiculite/peat support material. A second control tray was prepared admixing 1.0 percent dry weight P8000 linear polyacrylamide to the same support material.

No nutrients were added either initially or thereafter. Watering conditions were varied from those described in Example 6, in that not all trays were watered evenly or at the same time. When the total weight of the control tray fell below 1500 grams, all cells in the control and test trays were administered 5.0 milliliters of water. At other times, the test trays were watered (5.0 ml.) without watering the control tray.

The seedlings were monitored over a period of eight weeks, at which time observations were made which parallel those summarized in Example 6. Most of the control seedlings of this example were approximately 3 inches in height, with most between 2–4 inches. The seedlings were characterized as having small, sparse leaves, light green in color. Seedlings grown with the benefit of 0.5 percent linear polymer were mostly between 3–4 inches in height, averaging 3.5 inches. As compared to the control seedlings, these plants are noticeably heartier and better developed. Lastly, most of the seedlings grown in the presence of 1.0 percent linear polymer were between 3–5 inches in height, averaging 4 inches. On the average, all of these test seedlings were at least about an inch taller than the control seedlings. Again, all seedlings were observed to be more vigorous, with denser and bigger foliage.

Figure 11B:
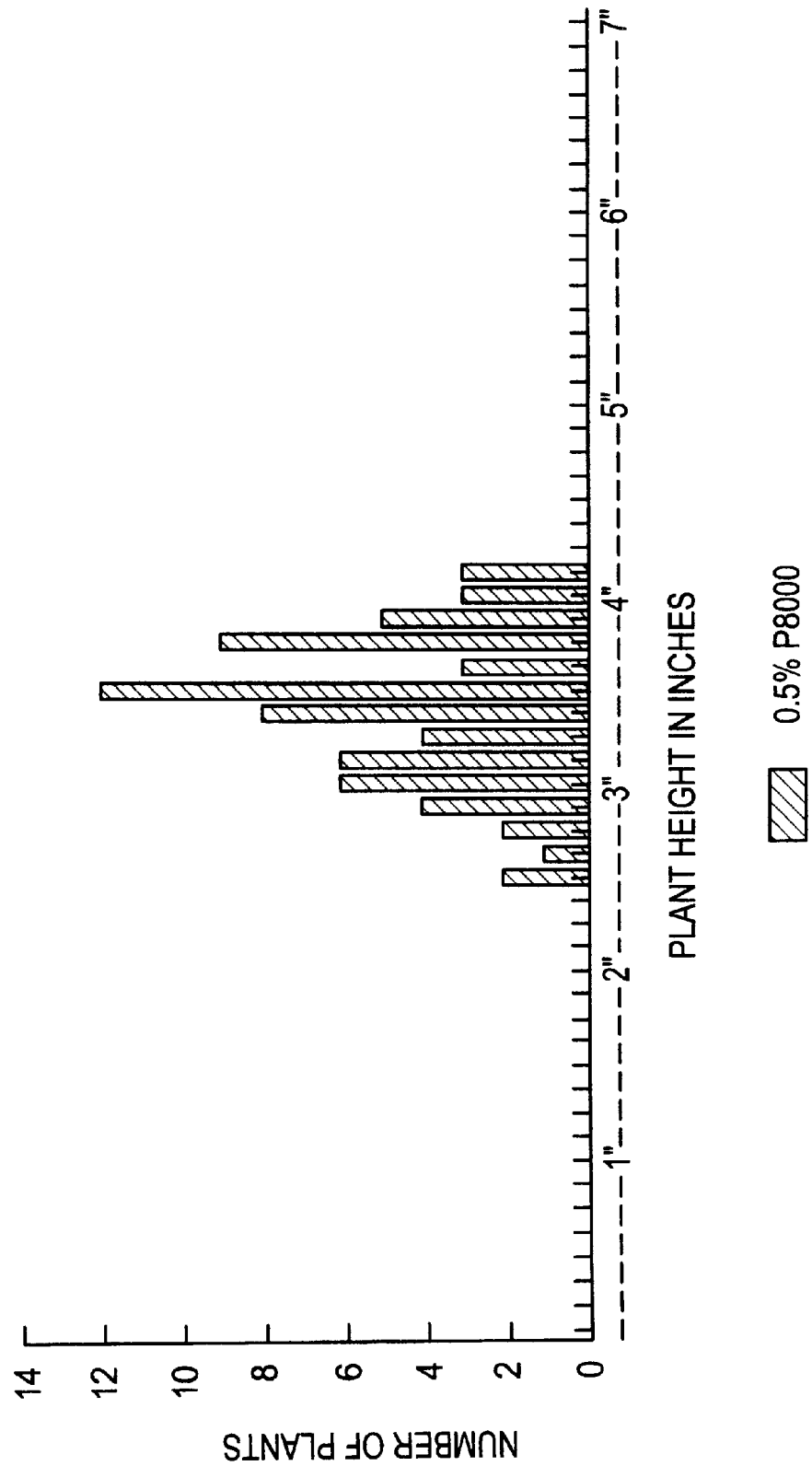

Height comparisons are summarized in FIG. 11A (control), 11B (0.5 percent polymer), and 11C (1.0% polymer). Again, it is seen that the media of this invention increase water retention, but release it in response to seedling growth and development.

Figure 12B:
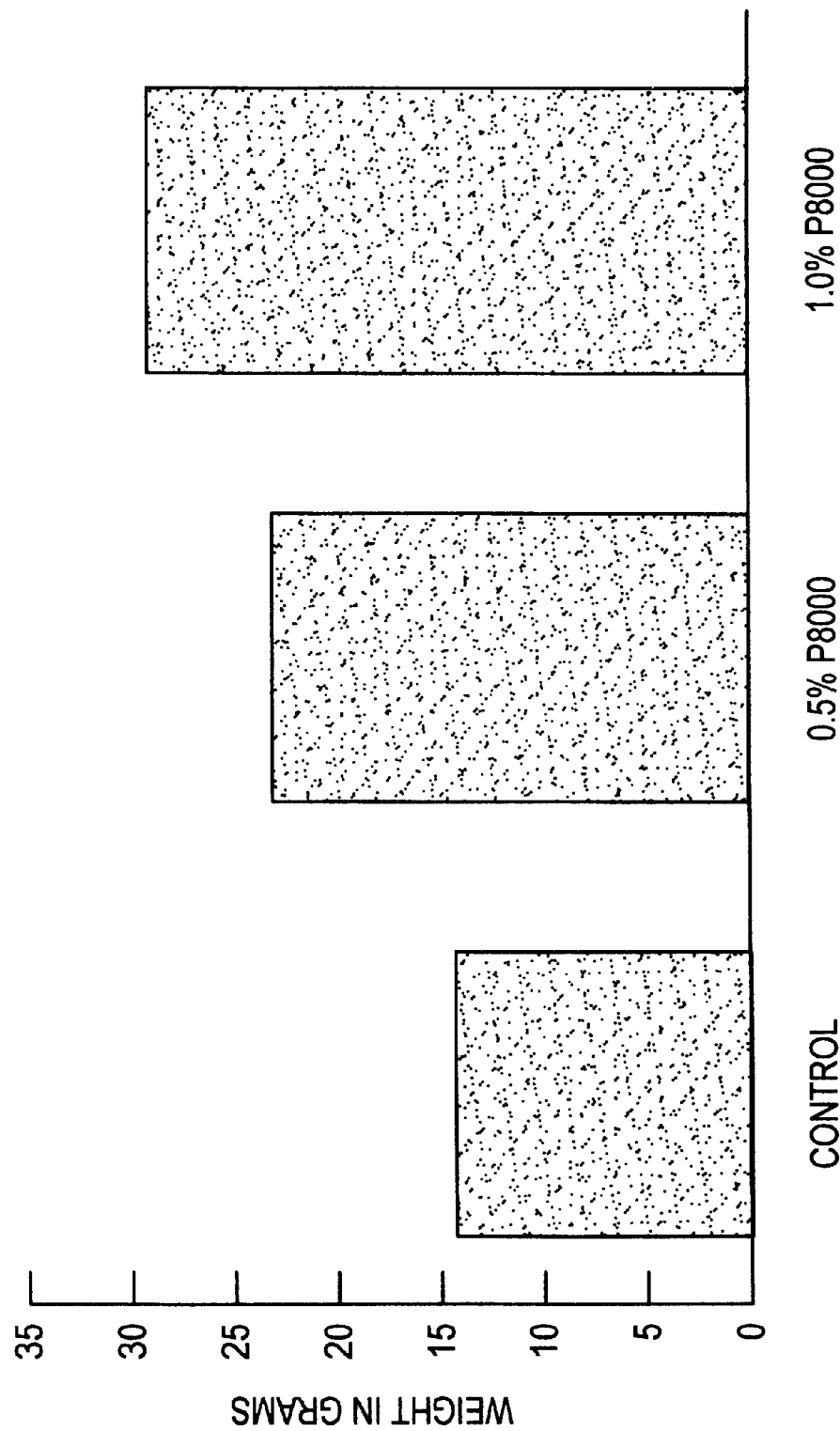
FIGS. 12A and B graphically extend the comparisons of FIGS. 11A–C to total weight of tomato plants grown under variable watering conditions and shows optimization of water uptake.

The variable watering technique of this example illustrates how use of the inventive linear polymer and media can optimize uptake of water by plants. FIG. 12A compares the distribution of plant weights—control (solid) vs. 0.5 percent (cross-hatched) vs. 1.0 percent (dotted) P8000—determined after the test period and employing the watering technique of Example 6. FIG. 12B shows total plant weight (control vs. 0.5 percent P8000 vs. 1.0 percent P8000).

Example 9

Figure 13B:
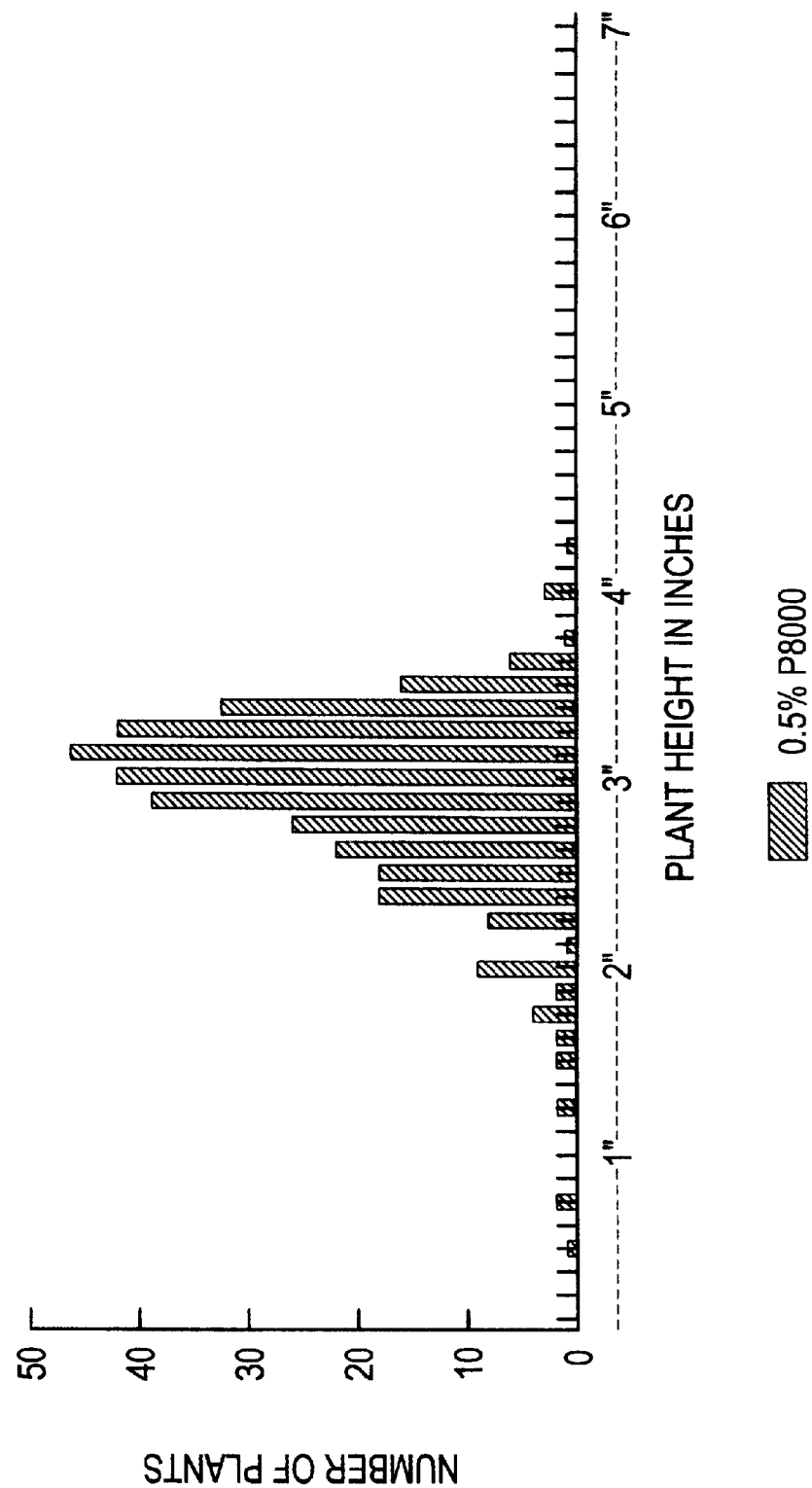

Extending the results obtained from field trials conducted with tomato seedlings (See Example 6) field trials were also conducted on multi-cell trays planted with celery seeds. The celery grown without fertilizer and watered as described in Example 6 was observed throughout the test period, and evaluated after 63 days. Each cell of the control and test trays was sown with a single celery seed and subjected to identical (amount and time intervals) watering conditions over the aforementioned 63-day period. Each cell was administered 5.0 ml. water at the times indicated in FIGS. 14A–C. The total weight of each tray (matrix, water, and plants) was taken before and after each watering. The celery grown in the control and test trays was measured with the heights recorded, as shown in FIGS. 13A–C. A greater number of celery plants grew taller in the inventive media, and as the weight percent of linear polyacrylamide therein was increased. Generally, consistent with the tomato seedlings of previous examples, the control plants were less hearty and vigorous, as evident through reduced plant size and amount, and coloration of foliage.

Consistent with the findings summarized in Examples 1–4 and 6–8, the polyacrylamide growth amendment of this invention exhibited excellent water retention characteristics. FIG. 14A shows the relative water levels and losses associated with each of the control and test trays over the test period; FIGS. 14B and 14C show more clearly this observation during week 1 and week 9, respectively, of the test period. The spikes shown represent the weight gain measured upon water administration. Approaching the end of the test period, the water retention characteristics of the inventive media and polyacrylamide is pronounced.

Example 10

The efficacy of the inventive media and polyacrylamides was extended to another monocotyledon, by way of simulated field production of tall fescue sod. Three plastic horticultural trays (dimensions 20⅜"×10⅛"×2¼" deep), used as liners for bedding plant transplants, were filled with a known weight of support soil to a depth of 1". All three trays were seeded identically: to an equivalent of 11 lb. of tall fescue grass seed per 1000 sq.ft. of surface area (7.2 grams). After evenly sprinkling the surface of the soil with the seed, ⅜" of soil was sprinkled over the surface of the seed. The extra soil added was also weighed. The grass seed added was also weighed. No P8000 was added to the control tray. In the first test tray, the equivalent of 11 lb. of P8000 per 1000 sq.ft. of surface (7.2 grams P8000) was evenly mixed with the seed. In the second test tray, the equivalent of 22 lb. of P8000 per 1000 sq.ft. of surface (14.4 grams P8000) was mixed evenly with the seed.

All trays were then watered identically and gravimetrically over the period of the test. At time zero, 500 grams of water were added to the surface of each tray by applying a fine mist of water (out of a laboratory dispensing bottle) evenly and slowly (over 5 minutes) over the entire surface of the soil in each tray. Over an 11-week period, the trays were weighed (about every 24 hours) and water was reapplied and the trays reweighed after watering. The weight profile of each tray was tracked before and after watering. The total weight profile of the trays changed to reflect the combination of a) increased water retention, and b) increased grass weight in the tray. See FIGS. 15A and 15B, which graphically illustrated the enhanced water retention during weeks 1 and 8, respectively. Periodically, the fescue grass was clipped to an even height of 2½" and clippings taken from each tray were collected and weighed, to further quantify the prolific growth in either P8000 tray versus the control. (See FIG. 16.)

Figure 16:
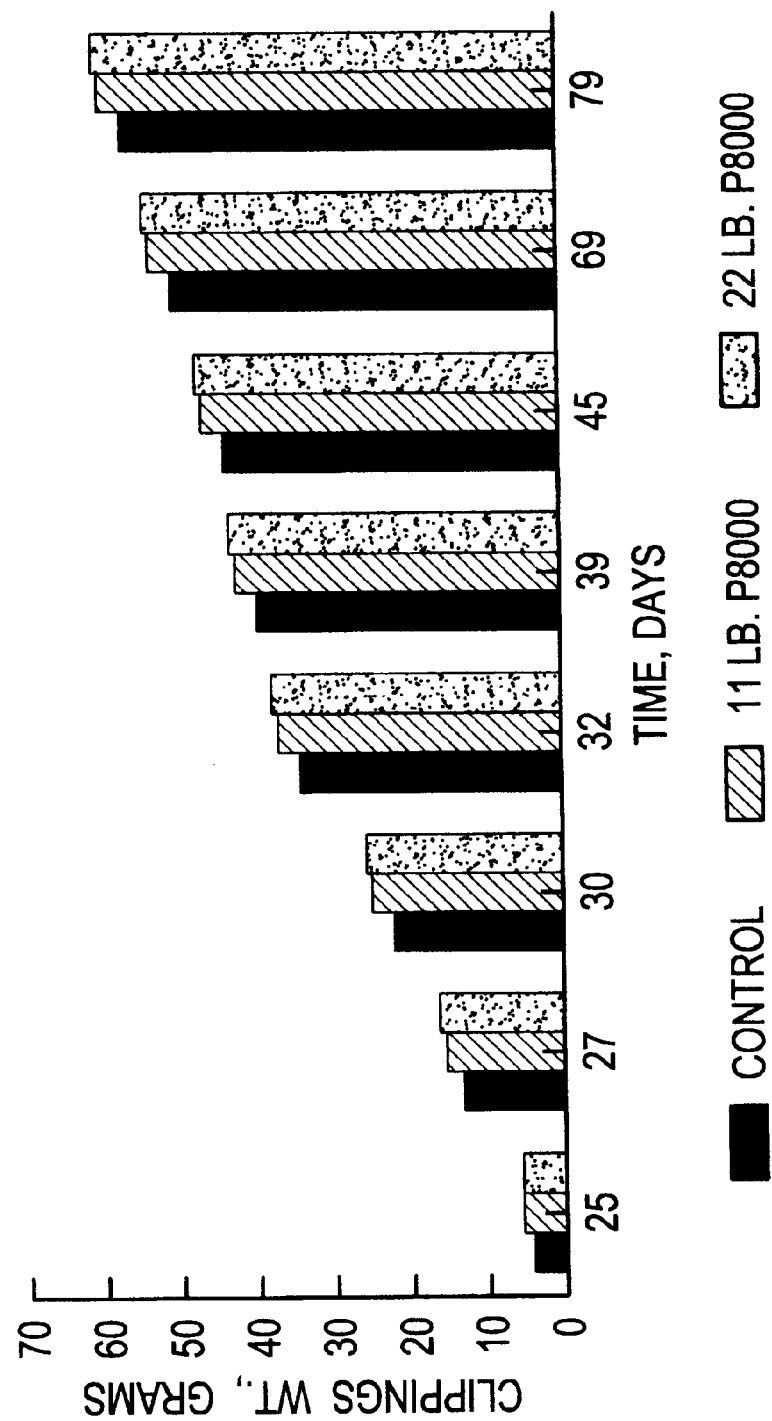
FIG. 16 graphically illustrates the improved grass growth available through use of the present invention by comparison of clipping weights: (shaded) control, (cross-hatched) 11 lb. P8000/1000 sq.ft. soil surface, and (dotted) 22 lb. P8000/1000 sq.ft. soil surface.

The results summarized in FIGS. 15A, 15B and 16 show that use of P8000, a preferred polyacrylamide of the present invention, increases water retention of the growth media and increases grass growth, relative to the controls utilized. In particular, application of P8000 at 22 lbs. per 1000 sq.ft. of surface soil gave better water retention characteristics and grass growth, as compared to 11 lbs. of P8000 over the same surface area.

Example 11

Utilizing control and test trays identical to those described in Example 10, the effect of higher application rates of P8000 and as administered through a water solution, were studied. The control tray was prepared as described above. The first test tray was prepared with an equivalent of 25 lbs. of P8000 per 1000 sq.ft. of surface (16.5 grams of P8000) mixed with the fescue seed. The second test tray was prepared with the equivalent of 50 lbs. of P8000 per 1000 sq.ft. of surface (33.0 grams of P8000) mixed with the fescue seed. The third test tray was prepared in a manner identical to the control, and a polyacrylamide of this invention (P8000) was administered as a 0.1% (w/w) aqueous solution simultaneous with incremental watering to simulate an alternative application method: no P8000 was applied to the soil at seeding. Consistent with the results summarized in the previous examples, water retention of the media in the presence of a inventive polyacrylamide was increased over that observed with the control, regardless of the concentration or method of application of the polymer. See, FIGS. 17A and 17B, for a graphic illustration of water retention during week 1, and week 6, respectively, of the test period. FIG. 17B shows more clearly that P8000 as an aqueous solution performs better than the same polyacrylamide applied at a rate of 25 lbs. per 1000 sq.ft. The same polymer applied with the seed at a rate of 50 lbs. per 1000 sq.ft. showed the best results.

Example 12

Figure 18B:
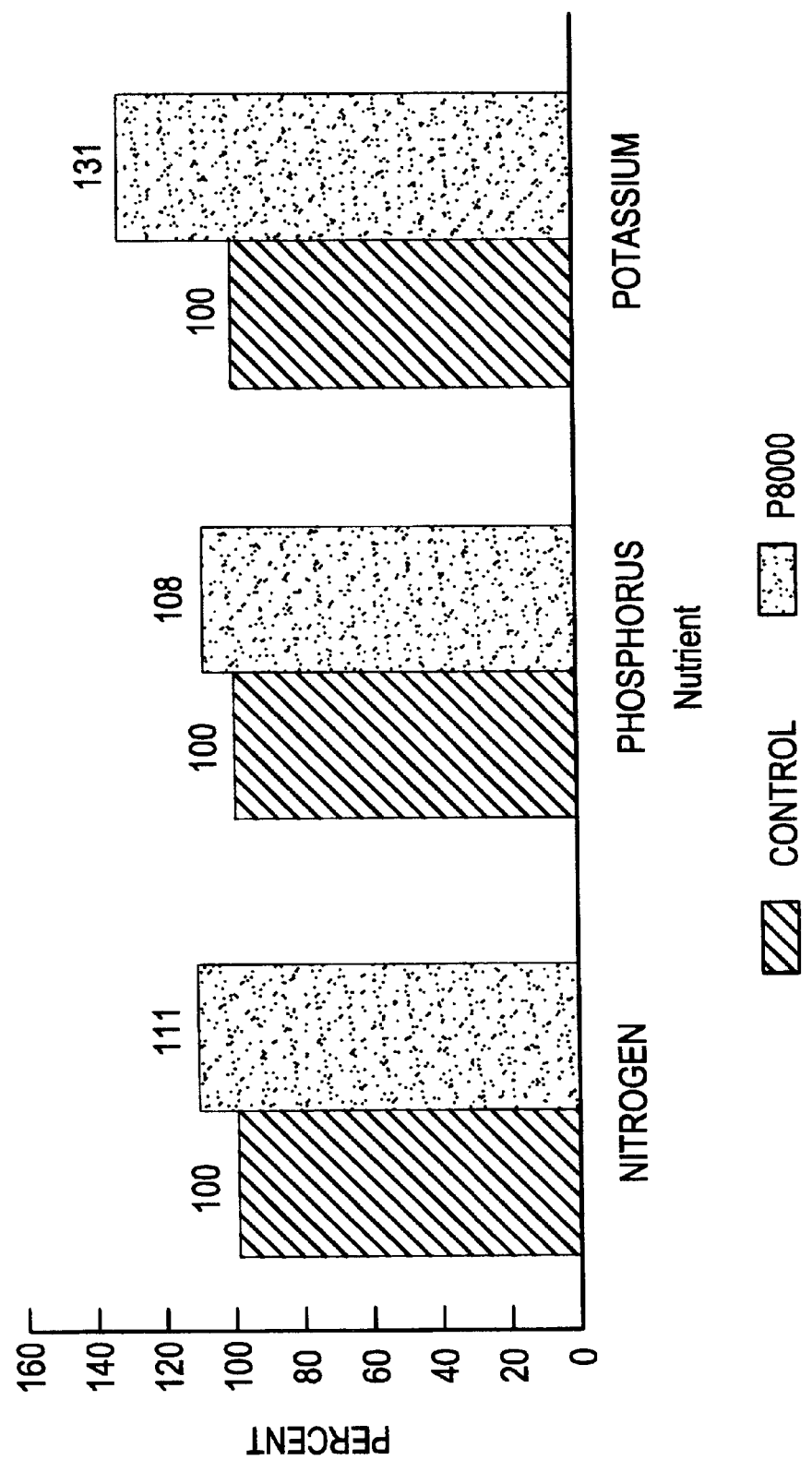

Cauliflower plants grown under commercial greenhouse conditions were analyzed to confirm enhanced nutrient uptake and/or incorporation. Seedlings grown in the presence of 1.0 wt. % P8000 under conditions identical (watering, commercial fertilizer, and 3 parts peat to 4 parts vermiculite) to controls (no P8000) were analyzed and compared at approximately 6 weeks. Seedlings (36) grown with P8000 were randomly-chosen and the leaves of each were removed. An equal number of control seedlings were also randomly-chosen and the corresponding leaves were removed from each. Each group of leaves was dried, prepped (acid-digestion), and analyzed for nitrogen, potassium, and phosphorus by atomic absorption spectroscopy. (Bolsa Analytical Laboratory, Hollister, Calif.) As shown in FIG. 18A, the average nutrient level (% of total plant weight) in plants grown as described herein exceed the control in every instance. The effect was most pronounced in the case of potassium where a 31% increase was observed. (See FIG. 18B.)

Example 13

The results summarized in Example 12 were corroborated with analyses conducted on celery seedlings, as shown in FIGS. 19A–D, and extended to show the unexpected results achieved when compared to gelling, cross-linked polymers of the prior art. The plants analyzed were grown under identical (watering, commercial fertilizer, and 50:50 (w/w) peat-vermiculite) commercial greenhouse conditions; the exception being that a portion of the plants were grown in the presence of 1.0 wt. % of the inventive P8000, a portion were grown in the presence of 1.0 wt. % of a cross-linked gel-forming potassium polyacrylate of the prior art commercially available under the trade name AQUAMEND, and a portion were used as a control (neither P8000 nor a gel).

Approximately 9 weeks after seeding, 22 plants, cropped at 4", were randomly-picked from each portion with the entire plug pulled intact. The roots of each plant were washed gently several times to remove adhering peat/vermiculite. The fresh total weight of each plant was determined, before the roots were clipped from the stalk and the dried total weight of each determined subsequently. In a procedure similar to that described in Example 12, the leaves of each plant were analyzed to compare nutrient uptake.

Figure 19A:
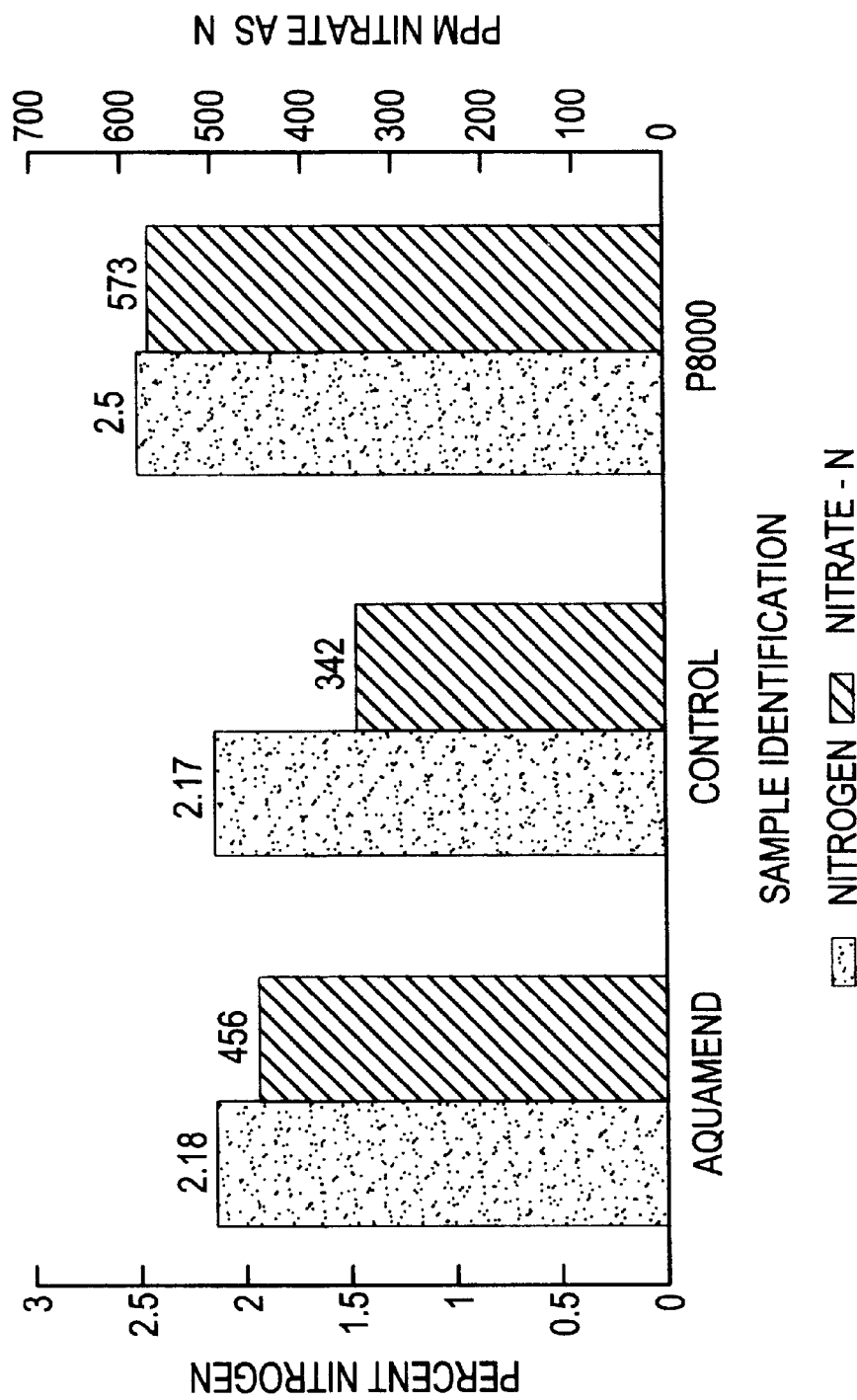

Referring to FIG. 19A, it is seen that plants grown in the presence of P8000 and in accordance with the present invention have higher average nitrogen levels (wt. % total nitrogen or ppm nitrate as nitrogen) than either the control plants or those grown with the prior art polymer. With respect to total nitrogen, it is noted that the control plants exhibited levels nearly identical to those grown with the prior art polymer. A similar profile is provided in FIG. 19B, graphically illustrating that average fresh total plant weight for plants grown in the presence of an inventive polymer such as P8000 exceeded that for either of the comparison groups—suggesting, when taken with the results summarized in FIG. 19A, that no benefit is gained through use of the prior art polymers.

The results summarized in FIG. 19C complement those provided in other examples and figures herein by showing that the gain in plant size available through use of the present invention is not defined solely by height. The average root weight of plants grown in the presence of P8000 is 12% greater than that of the control plants and 22% greater than the average root weight for those plants grown with a polymer of the prior art. These results illustrate a benefit of the invention, that being a bigger, more vigorous plant with greater girth and a better developed root structure—a plant better able to withstand adverse growing conditions or the trauma associated with transplanting. From this data, it is shown that P8000 aids in the uptake of water and nutrients, as demonstrated by the enhanced root systems of plants grown in accordance with the present invention.

Figure 19B:
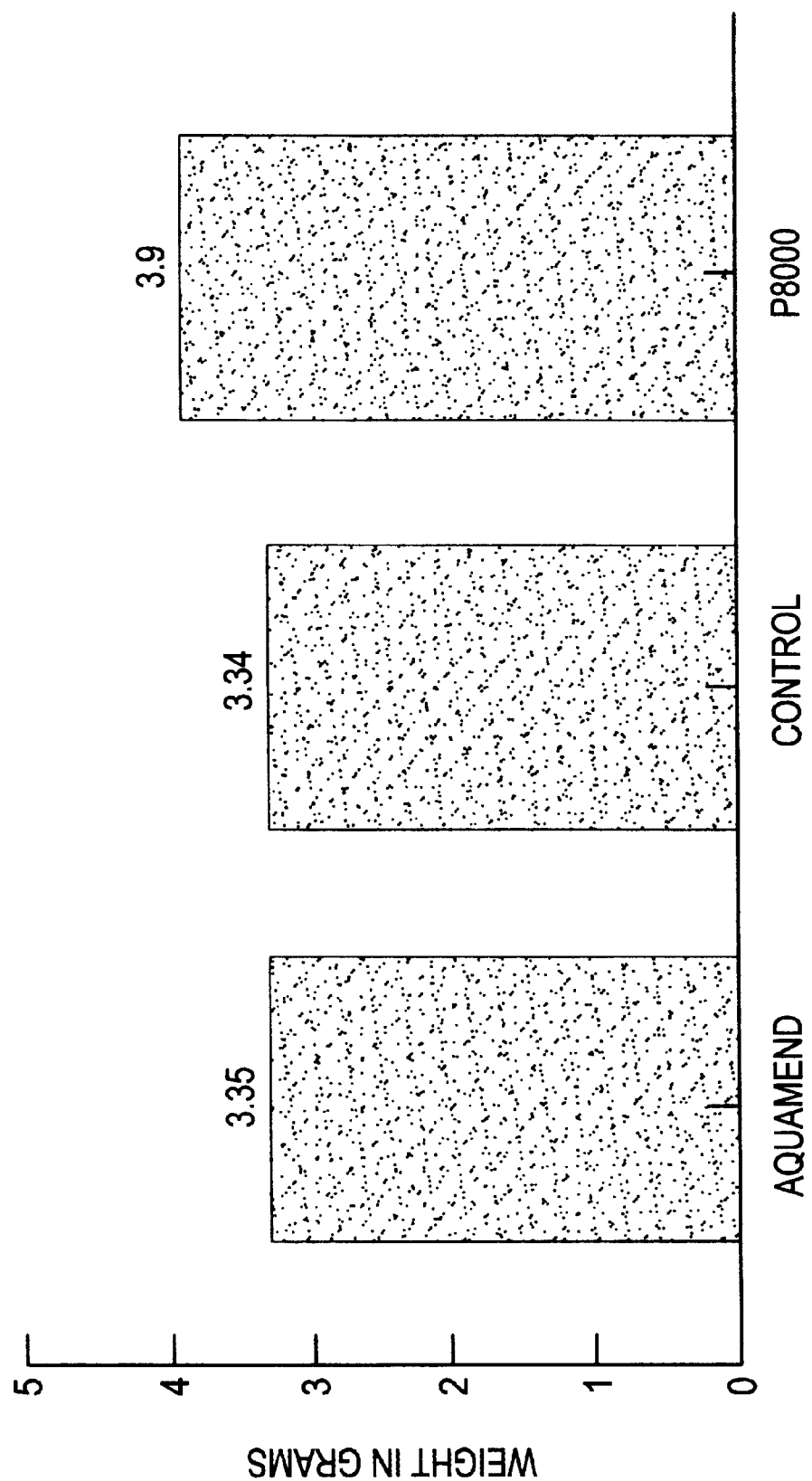

FIG. 19D summarizes moisture analyses conducted on the plants of this example and shows that the average percent moisture of the P8000-grown plants is less than that of either the comparison groups. The results confirm that the weight gains observed and illustrated in FIGS. 19B and 19C are attributable to enhanced plant tissue and fiber development and are a manifestation of a more healthy, densely-tissued, vigorous plant. The results presented here are consistent with other examples of the present invention, particularly those demonstrating heavier, more dense, fibrous mushrooms.

While the principles of this invention have been described in connection with specific embodiments, it should be understood clearly that these descriptions are made only by way of example and are not intended to limit the scope of the invention, in any manner. For example, the techniques, media, and methods described herein can be employed by those skilled in the art in an analogous fashion to optimize growth conditions and/or yields of a variety of other agricultural crops. Consistent with the scope of the invention, other immature vegetable, floral, ornamental, turf, and/or fruit plants having critical water and nutrient retention requirements, and cultivated commercially via transplant or hydroseeding procedures, can benefit through use of the substantially linear, water-soluble polymers described herein. Media for enhancing such growth and availability of water include about 0.1–5.0 weight percent linear polymer, and preferably about 0.5–2.0 weight percent, based on the growth matrix used. The enhanced growth and development observed through the methods, media, and/or polymers of this invention are not inconsistent or incompatible with any one of the various hardening methods/techniques known to those skilled in the art. The plants so obtained can be prepared/hardened to withstand post-transplant stress conditions in the field. Likewise, the invention may be used in conjunction with mushroom composting to improve the availability of the nutrients within the compost and/or otherwise enhance mushroom yields. The present invention also contemplates use of the described polymeric resins in conjunction with hydroponic systems and hydro-seeding with water as a support material, with or without various nutrients and/or fertilizers, to further enhance the growth and development available through such systems. In a similar fashion, the media, methods, and support materials of the present invention can include the presence or addition of other nutrients, amendments, and related growth improvement aids. Other advantages and features of the invention will become apparent from the claims hereinafter, with the scope of the claims determined by the reasonable equivalents as understood by those skilled in the art.

What is claimed is:

1. A medium for enhancing the growth of seedling transplants and availability of water and nutrients comprising a support material selected from the group consisting of peat moss, compost, reclaimed compost, vermiculite, bark, synthetic sponges, perlite and combinations thereof, having dispersed therewithin, a substantially linear water soluble polymer capable of forming a water retaining network with the support material, and which support material upon exposure to water and nutrients retains water and nutrients for seedling growth.

2. The medium as defined in claim 1 wherein said polymer contains at least one monomer selected from the group consisting of acrylic acid, methacrylic acid, maleic anhydride, and their carboxy functional equivalents, and acrylamide.

3. The medium as defined in claim 2 wherein said polymer is a copolymer of at least two of said monomers.

4. The medium as defined in claim 2 wherein said polymer is a homopolymer of acrylamide.

5. The medium as defined in claim 1 wherein said polymer is about 0.1–5.0 weight percent.

6. The medium as defined in claim 5 wherein said polymer is about 0.5–2.0 weight percent.

7. The medium as defined in claim 1 wherein said polymer is a homopolymer of acrylamide at about 0.1–5.0 weight percent.

8. The medium as defined in claim 1 comprising a support material of about 1:1 peat moss/vermiculite, and about 0.1–5.0 weight percent acrylamide homopolymer.

9. The medium as defined in claim 8 wherein said acrylamide homopolymer is about 0.5–2.0 weight percent.

10. A method for promoting the development of seedling transplants comprising the steps of:

a) providing a support material for plant growth selected from the group consisting of peat moss, compost, reclaimed compost, vermiculite, bark, synthetic sponges, perlite and combinations thereof;

b) dispersing within said support material a substantially linear water soluble polymer capable of forming a water soluble network within said material;

c) applying water and seeds to said material such that water and nutrients are absorbed by said polymer and the support media and are made more available for plant seedling growth, and then, d) germinating the seeds into seedling transplants.

11. The method as defined in claim 10 wherein said polymer contains at least one monomer selected from the group consisting of acrylic acid, methacrylic acid, maleic anhydride, and their carboxy functional equivalents, and acrylamide.

12. The method as defined in claim 11 wherein said polymer is a copolymer of at least two of said monomers.

13. The method as defined in claim 11 wherein said polymer is a homopolymer.

14. The method as defined in claim 10 wherein said support material is a mixture of peat and vermiculite, and said polymer is an acrylamide homopolymer at about 0.1–5.0 weight percent of said mixture.

15. The method as defined in claim 10 further including adding a growth-enhancing nutrient to said material.

16. The method as defined in claim 10 wherein said polymer is dissolved in water and added to a pre-moistened support material.

17. The medium of claim 1 which also contains a fertilizer.

* * * * *